United States Patent
Borgese et al.

(10) Patent No.: US 7,964,529 B2
(45) Date of Patent: *Jun. 21, 2011

(54) METHOD OF AGGLOMERATION

(75) Inventors: Christina Borgese, San Ramon, CA (US); Marc Privitera, Walnut Creek, CA (US); Kristine Tippit, Pleasanton, CA (US); Charles Fritter, Dublin, CA (US); Amanda Walker, Milpitas, CA (US)

(73) Assignee: The Clorox Company, Oakland, CA (US)

( * ) Notice: Subject to any disclaimer, the term of this patent is extended or adjusted under 35 U.S.C. 154(b) by 848 days.

This patent is subject to a terminal disclaimer.

(21) Appl. No.: 11/872,182

(22) Filed: Oct. 15, 2007

(65) Prior Publication Data

US 2010/0136336 A1  Jun. 3, 2010

Related U.S. Application Data

(63) Continuation-in-part of application No. 10/618,401, filed on Jul. 11, 2003, now abandoned, and a continuation-in-part of application No. 11/745,163, filed on May 7, 2007.

(60) Provisional application No. 60/805,007, filed on Jun. 16, 2006, provisional application No. 60/863,902, filed on Nov. 1, 2006.

(51) Int. Cl.
*B01J 20/00* (2006.01)
(52) U.S. Cl. .......... 502/400; 502/439; 23/313 R
(58) Field of Classification Search .......... 23/313 R; 502/400, 439; 119/173
See application file for complete search history.

(56) References Cited

U.S. PATENT DOCUMENTS

| | | | |
|---|---|---|---|
| 3,969,103 A | 7/1976 | Capes et al. | |
| 4,214,863 A | 7/1980 | Nixon | |
| 5,185,204 A | 2/1993 | Shimizu et al. | |
| 5,460,765 A | 10/1995 | Derdall et al. | |
| 6,582,637 B1 | 6/2003 | Phinney | |
| 7,077,723 B2 | 7/2006 | Bright et al. | |
| 2007/0289543 A1 * | 12/2007 | Petska et al. | 119/173 |

FOREIGN PATENT DOCUMENTS

EP  0573303 A1  12/1993

* cited by examiner

*Primary Examiner* — Edward M Johnson
(74) *Attorney, Agent, or Firm* — Ann Lee

(57) ABSTRACT

Disclosed herein is an improved pan agglomeration process for forming porous absorbent particles suitable for use as an animal litter. The process eliminates the need for a pre-wetting step, while forming agglomerates that are up to 65% lighter in weight than the raw material feed. In addition, the agglomerates can incorporate performance-enhancing actives, such as odor-controlling carbon.

15 Claims, 11 Drawing Sheets

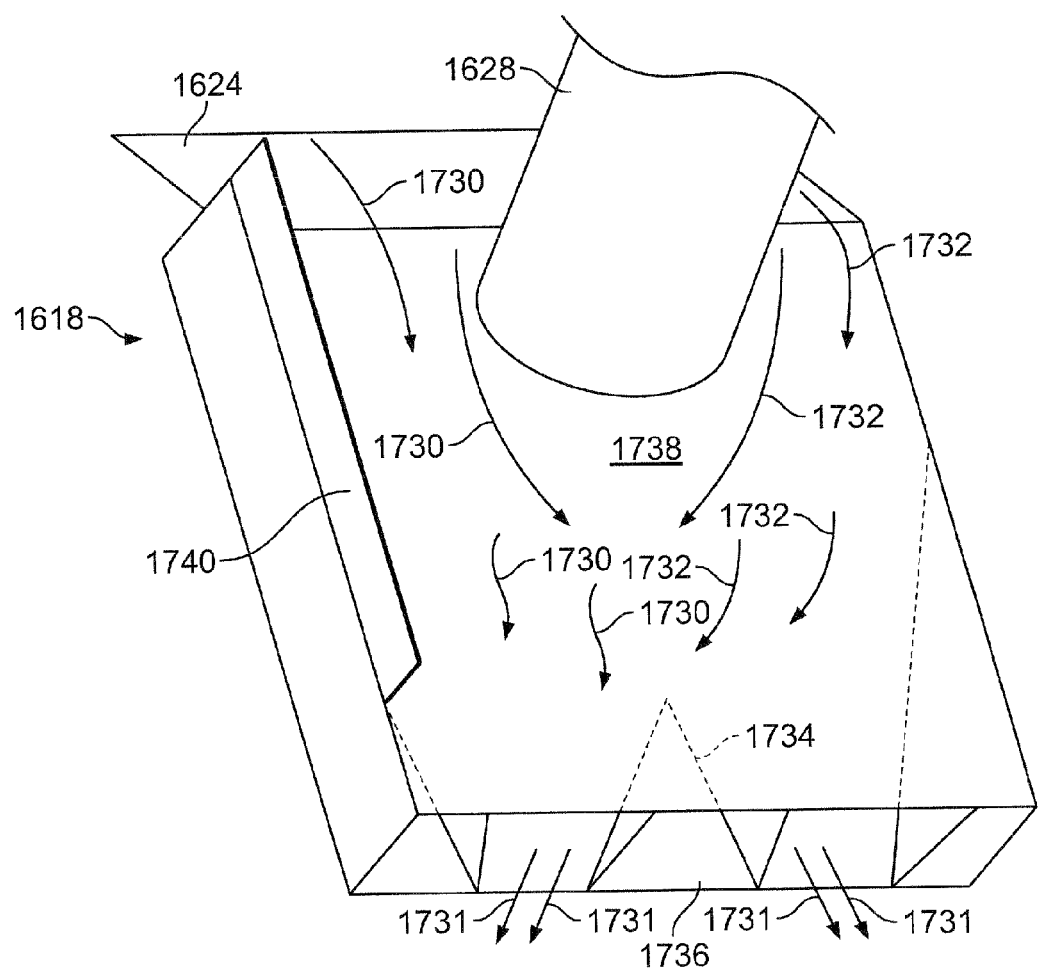
FIG. 12
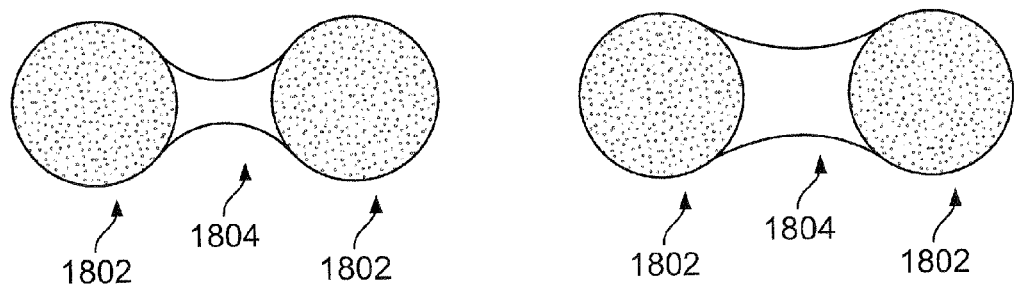
FIG. 13A  FIG. 13B

METHOD OF AGGLOMERATION

CROSS REFERENCE TO RELATED APPLICATIONS

This application is a continuation-in-part of application Ser. No. 10/618,401 filed Jul. 11, 2003, now abandoned which is hereby incorporated by reference in its entirety. This application is also a continuation-in-part of application Ser. No. 11/745,163, filed May 7, 2007 which claims the benefit of U.S. Provisional Application No. 60/805,007, filed Jun. 16, 2006, both of which are hereby incorporated by reference in their entirety. This application claims the benefit of U.S. Provisional Application No. 60/863,902, filed Nov. 1, 2006, which is hereby incorporated by reference in its entirety.

FIELD OF THE INVENTION

The present invention relates generally to an agglomeration process for forming porous agglomerated materials. More particularly, the present invention relates to a pan agglomeration process for forming porous absorbent materials suitable for use as animal litter.

BACKGROUND OF THE INVENTION

Clay has long been used as a liquid absorbent, and has found particular usefulness as an animal litter.

Because of the growing number of domestic animals used as house pets, there is a need for litters so that animals may micturate, void or otherwise eliminate liquid or solid waste indoors in a controlled location. Many cat litters use clay as an absorbent. Typically, the clay is mined, dried, and crushed to the desired particle size.

Other absorbent materials that are used alone, in combination, or in combination with clay include straw, sawdust, wood chips, wood shavings, porous polymeric beads, shredded paper, bark, cloth, ground corn husks, cellulose, water-insoluble inorganic salts, such as calcium sulfate, silica gel and sand.

Some clay litters have the ability to clump upon wetting. For example, sodium bentonite is a water-swellable clay which, upon contact with moist animal waste, is able to agglomerate with other moistened sodium bentonite clay particles. The moist animal waste is contained by the agglomeration of the moist clay particles into an isolatable clump, which can be removed from the container (e.g., litterbox) housing the litter. However, the clump strength of clay litters described above is typically not strong enough to hold the clump shape upon scooping, and inevitably, pieces of the litter break off of the clump and remain in the litter box, allowing waste therein to create malodors. Further, raw clay typically has a high clump aspect ratio when urinated in. The result is that the wetted portion of clay will often extend to the container containing it and stick to the side or bottom of the container.

Illustrative bentonite based litter compositions are disclosed in U.S. Pat. Nos. 5,503,111; 5,386,803; 5,317,990; 5,129,365 and RE 33,983, which are hereby incorporated by reference in their entirety.

Additives, such as starch or sugar based binders can be added to non-bentonite clays to create a litter material that behaves like a bentonite clay, i.e., upon contact with liquid (or moist) dross, readily agglomerates with other moistened clay particles. U.S. Pat. No. 5,359,961 discloses a clumping non-swelling clay based litter and is hereby incorporated by reference in its entirety.

What is needed is an absorbent material suitable for use as a cat litter/liquid absorbent that has better clumping characteristics, i.e., clump strength and aspect ratio, than absorbent materials heretofore known.

Another problem inherent in typical litters is the inability to effectively control malodors. Clay has very poor odor-controlling qualities, and inevitably waste build-up leads to severe malodor production. One attempted solution to the malodor problem has been the introduction of granular activated carbon (GAC) (20-8 mesh) into the litter. However, the GAC is usually dry blended with the litter, making the litter undesirably dusty. Other methods mix GAC and clay and compress the mixture into particles. In either case, the GAC concentration must typically be 1% by weight or higher to be effective. GAC is very expensive, and the need for such high concentrations greatly increases production costs. Further, because the clay and GAC particles are merely mixed, the litter will have GAC agglomerated in some areas, and particles with no GAC.

The human objection to odor is not the only reason that it is desirable to reduce odors. Studies have shown that cats prefer litter with little or no smell. One theory is that cats like to mark their territory by urinating. When cats return to the litterbox and don't sense their odor, they will try to mark their territory again. The net effect is that cats return to use the litter box more often if the odor of their markings are reduced.

Agglomeration processes have been around for decades. However, most agglomeration processes result in compacted agglomeration products with bulk densities equal to or higher than the raw feed material. Shipping costs of these agglomeration products often results in higher costs to the manufacturer due to the increase in weight.

Another problem with typical agglomeration processes is that the compaction used produces dense agglomerated materials that lack porosity, which results in limited utility.

What is needed is an absorbent material with improved odor-controlling properties, and that maintains such properties for longer periods of time.

What is further needed is an absorbent material with odor-controlling properties comparable to heretofore known materials, yet requiring much lower concentrations of odor controlling actives.

What is still further needed is an absorbent material with a lower bulk density while maintaining a high absorbency rate comparable to heretofore known materials.

SUMMARY OF THE INVENTION

The present invention provides composite absorbent particles and methods for making the same. An absorbent material is formed into a particle, preferably, by an agglomeration process. An optional performance-enhancing active is coupled to the absorbent material during the agglomeration process, homogeneously and/or in layers. Exemplary actives include antimicrobials, odor absorbers/inhibitors, binders (liquid/solid, silicate, ligninsulfonate, etc.), fragrances, health indicating materials, nonstick release agents, and mixtures thereof. Additionally, the composite absorbent particle may include a core material.

Methods disclosed for creating the absorbent particles include a pan agglomeration process, a high shear agglomeration process, a low shear agglomeration process, a high pressure agglomeration process, a low pressure agglomeration process, a rotary drum agglomeration process, a mix muller process, a roll press compaction process, a pin mixer process, a batch tumble blending mixer process, and an extrusion process. Fluid bed process may also represent a technique for forming the inventive particles.

The processing technology disclosed herein allows the "engineering" of the individual composite particles so that the characteristics of the final product can be predetermined. The composite particles are particularly useful as an animal litter. Favorable characteristics for a litter product such as odor control, active optimization, low density, low tracking, low dust, strong clumping, etc. can be optimized to give the specific performance required. Another aspect of the invention is the use of encapsulated actives, i.e., formed into the particle itself and accessible via pores or discontinuities in the particles. Encapsulation of actives provides a slow release mechanism such that the actives are in a useful form for a longer period of time. Thus, the present invention's engineered composite particle optimizing the performance enhancing actives is novel in light of the prior art.

An aspect of the invention comprises a method for forming porous agglomerated particles comprising: (a) providing feed particles between 50-325 Tyler number equivalent without pre-wetting the feed particles: (b) feeding said feed particles into a pan agglomerator such that the feed particles enter substantially at the back of the pan; (c) providing a uniform distribution of uniformly-sized liquid droplets onto the feed particles and growing agglomerate particles; (d) rotating and tilting the pan such that the liquid droplets are not applied directly to the bed of the pan; and (f) forming porous agglomerated particles that have a moisture content between 0 and 40 percent.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

FIG. 12 is an illustration of an exemplary over/under feed.

FIGS. 13a and 13b are illustrations of the formation of particle-to-particle bonds.

BEST MODES FOR CARRYING OUT THE INVENTION

Figure 1:
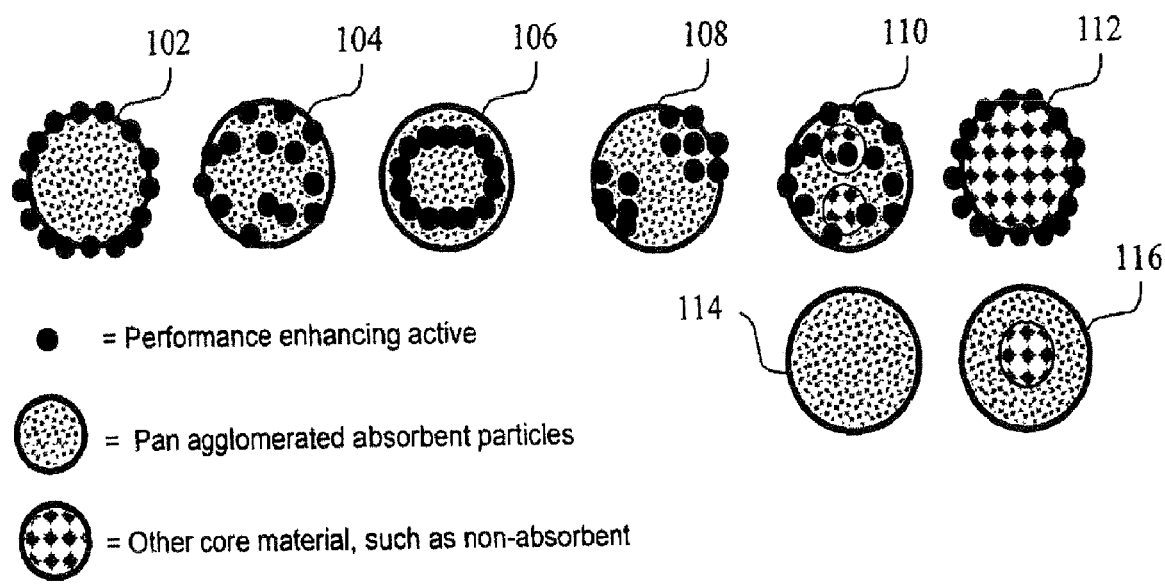
FIG. 1 illustrates several configurations of absorbent composite particles according to various embodiments of the present invention.

The following description includes the best embodiments presently contemplated for carrying out the present invention. This description is made for the purpose of illustrating the general principles of the present invention and is not meant to limit the inventive concepts claimed herein.

Before describing the present invention in detail, it is to be understood that this invention is not limited to particularly exemplified systems or process parameters as such may, of course, vary. It is also to be understood that the terminology used herein is for the purpose of describing particular embodiments of the invention only, and is not intended to limit the scope of the invention in any manner. As is generally accepted by those of ordinary skill in the animal litter art, the following terms have the following meanings. The terms scoopable and clumping litter as used herein refer to a litter that agglomerates upon wetting such that the soiled portion can be removed from the litter box leaving the unsoiled portion available for reuse. The term non-clumping or poorly clumping as used herein refers to a litter material doesn't agglomerate upon wetting to the extent that the soiled portion could be easily removed from the litter box. As will be discussed in further detail below, additives may be added to a non-clumping or poorly clumping litter substrate to create clumping behavior.

All publications, patents and patent applications cited herein, whether supra or infra, are hereby incorporated by reference in their entirety to the same extent as if each individual publication, patent or patent application was specifically and individually indicated to be incorporated by reference.

It must be noted that, as used in this specification and the appended claims, the singular forms "a," "an" and "the" include plural referents unless the content clearly dictates otherwise. Thus, for example, reference to a "color masking agent" includes two or more such agents.

Unless defined otherwise, all technical and scientific terms used herein have the same meaning as commonly understood by one of ordinary skill in the art to which the invention pertains. Although a number of methods and materials similar or equivalent to those described herein can be used in the practice of the present invention, the preferred materials and methods are described herein.

All numbers expressing quantities of ingredients, constituents, reaction conditions, and so forth used in the specification and claims are to be understood as being modified in all instances by the term "about". Notwithstanding that the numerical ranges and parameters setting forth the broad scope of the subject matter presented herein are approximations, the numerical values set forth in the specific examples are reported as precisely as possible. All numerical values, however, inherently contain certain errors necessarily resulting from the standard deviation found in their respective testing measurements.

The following description includes embodiments presently contemplated for carrying out the present invention. This description is made for the purpose of illustrating the general principles of the present invention and is not meant to limit the inventive concepts claimed herein.

As used herein particle size refers to sieve screen analysis by standard ASTM methodology (ASTM method D6913-04e1). As used herein the term "agglomerate" means a larger particle resulting from the binding together of smaller particles. The process of agglomerating can be described as taking "raw material" or "feed particles" and growing these particles into increasingly larger particles, i.e., "growing agglomerates".

Agglomerates can be agglomerated materials formed from smaller particles of the same substance (e.g., 100% bentonite) or agglomerated particles formed from smaller particles of different substances (e.g., 95% bentonite and 5% carbon). Agglomerated particles formed from smaller particles of different substances may be herein referred to as composite particles or composites and composite particles that are blended with either composites having a different composition (e.g., composites comprising bentonite and carbon blended with composites comprising bentonite and expanded perlite) and/or agglomerated absorbent material (e.g., agglomerated bentonite) and/or non-agglomerated absorbent materials (e.g., non-agglomerated bentonite) may be herein referred to as composite blends.

Non-agglomerated particles may be referred to herein as "raw material" or "feed particle(s)".

The agglomerated materials produced from the processes disclosed herein weigh less than the raw materials and are potentially more porous than the raw materials. The term bulk density reduction (BDR) refers to a reduction in bulk density between the agglomerated material and the raw feed material. As will be discussed in detail below, the particles can be "engineered" with specific BDR and/or porosity parameters in mind.

Disclosed herein are several pan agglomeration processes that in combination with the raw materials used allows the manufacturer to control some of the physical properties of the resulting agglomerated particles, such as porosity, bulk density, dust, strength, as well as PSD (particle size distribution) without changing the fundamental composition and properties of the raw materials.

The methods disclosed herein have been found to be effective at producing animal litters with desired properties, so much of the discussion will focus on materials and material properties associated with animal litter. It should be noted, however, that the pan agglomeration processes described herein could be appropriate for use with other applications as well.

The present invention relates generally to composite absorbent particles with improved physical and chemical properties comprising an absorbent material and optional performance-enhancing actives. By using various processes described herein, such particles can be "engineered" to preferentially exhibit specific characteristics including but not limited to improved odor control, lower density, easier scooping, better particle/active consistency, higher clump strength, etc. One of the many benefits of this technology is that the performance-enhancing actives may be positioned to optimally react with target molecules such as but not limited to odor causing volatile substances, resulting in surprising odor control with very low levels of active ingredient.

A preferred use for the absorbent particles is as a cat litter, and therefore much of the discussion herein will refer to cat litter applications. However, it should be kept in mind that the absorbent particles have a multitude of applications, and should not be limited to the context of a cat litter.

One preferred method of forming the absorbent particles is by agglomerating granules of an absorbent material in a pan agglomerator. A preferred pan agglomeration process is set forth in more detail below, but is described generally here to aid the reader. Generally, the granules of absorbent material are added to an angled, rotating pan. A fluid or binder is added to the granules in the pan to cause binding of the granules. As the pan rotates, the granules combine or agglomerate to form particles. Depending on pan angle and pan speed among other factors, the particles tumble out of the agglomerator when they reach a certain size. The particles are then dried and collected.

The pan agglomerator is one method of tumble or growth agglomeration. A more detailed description of tumble/growth agglomeration can be found in "Agglomeration Processes Phenomena, Technologies, Equipment" Chapters 6 and 7 by Wolfgang Pietsch (2002), which is hereby incorporated by reference in its entirety.

One or more performance-enhancing actives are preferably added to the particles in an amount effective to perform the desired functionality or provide the desired benefit. For example, these actives can be added during the agglomeration process so that the actives are incorporated into the particle itself, or can be added during a later processing step.

FIG. 1 shows several embodiments of the absorbent particles of the present invention. These particles have actives incorporated:
1. In a layer on the surface of a particle (102)
2. Evenly (homogeneously) throughout a composite litter particle (104)
3. In a concentric layer(s) throughout the particle and/or around a core (106)
4. In pockets or pores in and/or around a particle (108)
5. In a particle with single or multiple cores (110)
6. Utilizing non-absorbent cores (112)
7. No actives (114)
8. No actives, but with single or multiple cores (116)
9. In any combination of the above As previously recited hereinabove, other particle-forming processes may be used to form the inventive particles of the present invention. For example, without limitation, extrusion and fluid bed processes appear appropriate. Extrusion process typically involves introducing a solid and a liquid to form a paste or doughy mass, then forcing through a die plate or other sizing means. Because the forcing of a mass through a die can adiabatically produce heat, a cooling jacket or other means of temperature regulation may be necessary. The chemical engineering literature has many examples of extrusion techniques, equipment and materials, such as "Outline of Particle Technology," pp. 1-6 (1999), "Know-How in Extrusion of Plastics (Clays) or NonPlastics (Ceramic Oxides) Raw Materials, pp. 1-2, "Putting Crossflow Filtration to the Test," *Chemical Engineering*, pp. 1-5 (2002), and Brodbeck et al., U.S. Pat. No. 5,269,962, especially col. 18, lines 30-61 thereof, all of which is incorporated herein by reference thereto. Fluid bed process is depicted in Coyne et al., U.S. Pat. No. 5,093,021, especially col. 8, line 65 to col. 9, line 40, incorporated herein by reference.

Materials

Many liquid-absorbing materials may be used without departing from the spirit and scope of the present invention. Illustrative absorbent materials include but are not limited to minerals, fly ash, absorbing pelletized materials, perlite, silicas, other absorbent materials and mixtures thereof. Preferred minerals include: bentonites, zeolites, fullers earth, attapulgite, montmorillonite diatomaceous earth, opaline silica, Georgia White clay, sepiolite, calcite, dolomite, slate, pumice, tobermite, marls, attapulgite, kaolinite, halloysite, smectite, vermiculite, hectorite, Fuller's earth, fossilized plant materials, expanded perlites, gypsum and other similar minerals and mixtures thereof. The preferred absorbent material is sodium bentonite having a mean particle diameter of about 5000 microns or less, preferably about 3000 microns or less, and ideally in the range of about 25 to about 150 microns.

Because minerals, and particularly clay, are heavy, it is may be desirable to reduce the weight of the composite absorbent particles to reduce shipping costs, reduce the amount of material needed to need to fill the same relative volume of the litter box, and to make the material easier for customers to carry. To lower the weight of each particle, a lightweight core material, or "core," may be incorporated into each particle. The core can be positioned towards the center of the particle with a layer or layers of absorbent and/or active surrounding the core in the form of a shell. This configuration increases the active concentration towards the outside of the particles, making the active more effective. The shell can be of any desirable thickness. In one embodiment with a thin shell, the shell has an average thickness of less than about ½ that of the average diameter of the particle, and preferably the shell has an average thickness of not less than about 1/16 that of the average diameter of the particle. More preferably, the shell has an average thickness of between about 7/16 and ⅛ that of the average diameter of the particle, even more preferably less than about ½ that of the average diameter of the particle, and ideally between about ⅜ and ⅛ that of the average diameter of the particle. Note that these ranges are preferred but not limiting.

According to another embodiment comprising a core and absorbent material surrounding the core in the form of a shell, an average thickness of the shell is at least about four times an average diameter of the core. In another embodiment, an average thickness of the shell is between about 1 and about 4 times an average diameter of the core. In yet another embodiment, an average thickness of the shell is less than an average diameter of the core. In a further embodiment, an average thickness of the shell is less than about one-half an average diameter of the core.

Other ranges can be used, but the thickness of the shell of absorbent material/active surrounding a non-clumping core should be balanced to ensure that good clumping properties are maintained.

In another embodiment, the absorbent material "surrounds" a core (e.g., powder, granules, clumps, etc.) that is dispersed homogeneously throughout the particle or in concentric layers. For example, a lightweight or heavyweight core material can be agglomerated homogeneously into the particle in the same way as the active. The core can be solid, hollow, absorbent, nonabsorbent, and combinations of these.

Exemplary lightweight core materials include but are not limited to calcium bentonite clay, Attapulgite clay, Perlite, Silica, non-absorbent siliceous materials, sand, plant seeds, glass, polymeric materials, and mixtures thereof. A preferred material is a calcium bentonite-containing clay which can weigh about half as much as bentonite clay. Calcium bentonite clay is non-clumping so it doesn't stick together in the presence of water, but rather acts as a seed or core. Granules of absorbent material and active stick to these seed particles during the agglomeration process, forming a shell around the seed.

Using the above lightweight materials, a bulk density reduction of ≧10%, ≧20%, preferably ≧30%, more preferably ≧40%, and ideally ≧50% can be achieved relative to generally solid particles of the absorbent material (e.g., as mined) and/or particles without the core material(s). For example, in a particle in which sodium bentonite is the absorbent material, using about 50% of lightweight core of calcium bentonite clay results in about a 42% bulk density reduction.

Heavyweight cores may be used when it is desirable to have heavier particles. Heavy particles may be useful, for example, when the particles are used in an outdoor application in which high winds could blow the particles away from the target zone. Heavier particles also produce an animal litter that is less likely to be tracked out of a litter box. Illustrative heavyweight core materials include but are not limited to sand, iron filings, etc.

Note that the bulk density of the particles can also be adjusted (without use of core material) by manipulating the agglomeration process to increase or decrease pore size within the particle.

Note that active may be added to the core material if desired. Further, the core can be selected to make the litter is flushable. One such core material is wood pulp.

Performance-enhancing actives as defined herein mean any component that enhances the absorbent materials performance as an animal litter. Performance enhancing actives can be agglomerated along with the absorbent particles or can be blended with or affixed to the absorbent material agglomerates. Illustrative materials for the performance-enhancing active(s) include but are not limited to antimicrobials, odor absorbers/inhibitors, binders, fragrances, health indicating materials, nonstick release agents, superabsorbent materials, light-weighting materials, heavy weight materials, reinforcing fiber materials and mixtures and combinations thereof. One great advantage of the particles of the present invention is that substantially every agglomerated particle contains an active, or in the case of an agglomerate blend (i.e., agglomerated material blended with non-agglomerated material), the actives are substantially distributed throughout the final product.

Preferred antimicrobial actives are boron containing compounds such as borax pentahydrate, borax decahydrate, boric acid, polyborate, tetraboric acid, sodium metaborate, anhydrous, boron components of polymers, and mixtures thereof.

One type of odor absorbing/inhibiting active inhibits the formation of odors. An illustrative material is a water soluble metal salt such as silver, copper, zinc, iron, and aluminum salts and mixtures thereof. Preferred metallic salts are zinc chloride, zinc gluconate, zinc lactate, zinc maleate, zinc salicylate, zinc sulfate, zinc ricinoleate, copper chloride, copper gluconate, and mixtures thereof. Other odor control actives include metal oxide nanoparticles. Additional types of odor absorbing/inhibiting actives include cyclodextrin, zeolites, activated carbon, acidic, salt-forming materials, and mixtures thereof.

The preferred odor absorbing/inhibiting active is Powdered Activated Charcoal (PAC), though Granular Activated Carbon (GAC) can also be used. PAC gives much greater surface area than GAC (something larger than powder (e.g., ≧80 mesh U.S. Standard Sieve (U.S.S.S.))), and thus has more sites with which to trap odor-causing materials and is therefore more effective. PAC has only rarely been used in absorbent particles, and particularly animal litter, as it tends to segregate out of the litter during shipping, thereby creating excessive dust (also known as "sifting"). By agglomerating PAC into particles, the present invention overcomes the problems with carbon settling out during shipping. Additionally, carbon is black in color. Agglomerating the PAC (and/or GAC) into the composite (or adding it to the composites by a later processing step) aids in diluting the black color of the carbon, a factor known to be disliked by cat litter consumers. The above-mentioned benefits of incorporating carbon into the composites are true for composite blends, as well. Generally, the preferred mean particle diameter of the carbon particles used is less than about 500 microns, but can be larger. The preferred particle size of the PAC is about 150 microns (~100 mesh U.S.S.S.) or less, and ideally in the range of about 25 to 150 microns, with a mean diameter of about 50 microns (~325 mesh U.S.S.S.) or less.

The active may be calcium bentonite added to reduce sticking to a litter box.

The active may also include a binder such as water, lignin sulfonate (solid), polymeric binders, fibrillated Teflon®

(polytetrafluoroethylene or PTFE), and combinations thereof. Useful organic polymerizable binders include, but are not limited to, carboxymethylcellulose (CMC) and its derivatives and its metal salts, guar gum cellulose, xanthan gum, starch, lignin, polyvinyl alcohol, polyacrylic acid, styrene butadiene resins (SBR), and polystyrene acrylic acid resins. Water stable particles can also be made with crosslinked polyester network, including but not limited to those resulting from the reactions of polyacrylic acid or citric acid with different polyols such as glycerin, polyvinyl alcohol, lignin, and hydroxyethylcellulose.

Dedusting agents can also be added to the particles in order to reduce the dust ratio. Many of the binders listed above are effective dedusting agents when applied to the outer surface of the composite absorbent particles. Other dedusting agents include but are not limited to gums, resins, water, and other liquid or liquefiable materials.

A dye or pigment such as a dye, bleach, lightener, etc. may be added to vary the color of absorbent particles, such as to lighten the color of litter so it is more appealing to an animal, etc.

Suitable superabsorbent materials include superabsorbent polymers such as AN905SH, FA920SH, and FO4490SH, all from Floerger. Preferably, the superabsorbent material can absorb at least 5 times its weight of water, and ideally more than 10 times its weight of water.

Reinforcing fiber material(s) (hereinafter "fiber(s)") may be added to increase clump strength and/or reduce the overall bulk density of the litter material. Fibers are any solid material having a mean cylindrical shape and a length to diameter aspect ratio greater than one that helps to maintain the structural integrity of litter clumps once formed. The fibers may range in particle size from about 1 nm to about 5 mm. The fibers are typically in the size range of about 1 nm to about 5 mm prior to agglomeration, but could be up to 6 inches depending on whether the process used first breaks down the material into a smaller size prior to forming composite particles. The fibers may comprise between 0.1 and 50% of the composite particle, but typically are present in an amount less than 20% (i.e., 19% or less).

Preferred fibers include any solid material that demonstrates a mean cylindrical shape with a large length to diameter aspect ratio (e.g., 2 to 1 or greater) and the following two properties. First, a built tensile strength that is due to molecular orientation induced by the formation of the fiber whether natural or synthetically produced. Second, a surface morphology that creates bonding sites that allow the fiber to reinforce the overall structure of the particle. The bonding sites may be created either by allowing association with other chemical elements and structures (e.g., hydrogen bonding as present in polyester) or by a physical interlocking of surface morphologies (e.g., puzzle pieces).

Fibers may be made of materials such as, but not limited to natural materials, e.g., wool, cotton, hemp, rayon, lyocell, paper, paper fluff, cellulose, regenerated cellulose, bird feathers, carbon, activated carbon, as well as synthetic materials, e.g., polyester, nylon, plastics, polymers (including super absorbent polymers (SAPs) and copolymers). Combinations of these materials are also possible, as in the multi-component fibers discussed below. Illustrative reinforcing fibers include paper fluff, DuPont's Kevlar® (poly-paraphenylene terephthalamide) yarn, PET (polyethylene terephthalate), Tencel® cellulose fiber, rayon, cotton, poultry feather parts, cellulose, and combinations thereof. Reclaim, i.e., a recycled mixture incorporating some or all of the synthetic materials listed above, could also be used.

In addition, fibers recovered as a byproduct or waste product from another process can also be incorporated in the absorbent particles. For example, the fibrous waste from a paper or tissue manufacturing process can be used. The size of the fibers is not critical, and can range from small particles captured by a dust collection process to relatively larger particles.

Other performance-enhancing actives may be embedded within the fibers or attached to the surface of the fibers to augment a specific consumer-benefiting feature, such as odor control or enhanced absorptivity or both. Cotton fibers embedded with activated carbon could be combined with an absorbent clay to form composite particles suitable for use as an animal litter having increased odor control. Non-woven fibers charged with SAPs (e.g., BASF luquafleece IS) can be combined with an absorbent clay to form composite particles having increased absorptivity. The resulting litter compositions have the advantage of controlling odors and moisture as strong clumps are formed.

Benefits imparted by the fibers (either alone or in combination with other performance-enhancing actives) may include without limitation, increased structural integrity (e.g., less breakage and dust), increased clump strength, increased liquid absorption, abrasion resistance, animal attractant/repellant, visual aesthetics, tactile aesthetics, lower overall bulk weight, and increased odor control (e.g., activated carbon fibers). Clump strength is a measure of the mechanisms that aid in the formation of agglomerates (moist litter particles that stick together) in the litter box. Crimped fibers (helical and saw-tooth) may provide higher clumping strength or reduced attrition in processing and handling.

Bicomponent and/or multi-component fibers may provide additional benefits. For example, one component of the fiber may melt and act as an adhesive during the agglomeration drying process to further enhance the strength of the composite particles, while the other component may retain its length/integrity in order to provide a reinforcing benefit and increase clump strength. When the fiber is subjected to the melt temp of the lower meting component, the lower melting component acts as the adhesive, while the higher melting component retains the shape and a portion of the integrity of the fiber. Some examples include fibers made of both polyethylene and polyester, or polyethylene and polypropylene in a side by side or a sheath/core configuration.

Additional attributes may be present if the fibers are porous. Fiber porosity could lead to a three-fold benefit: (1) light-weighting (i.e., a decrease in the bulk density of the litter composition), (2) increased odor and/or moisture absorption (i.e., within the pores due to an increase in surface area), and (3) encapsulation/carrier vehicle for performance-enhancing actives, such as odor absorbers, moisture absorbers, antimicrobials, fragrances, clumping agents, etc. These benefits combined with the aforementioned additional clump strength and clump integrity are unexpected. Generally lower density, higher porosity litter materials with litter additives work to decrease clump strength. This common drawback is overcome by the composite particles disclosed herein.

When only 2% paper fluff fibers are added to a primarily sodium bentonite composition via a pilot plant scale pin mixer equipped with a rotary drier, a 13% reduction in bulk density is observed.

The clump aspect ratio, which is defined as Square root ((longest clump length)2+(shortest clump length)2)/clump height may be affected by the addition of fibers to the composite particles. In general, it is desirable to have a round clump, which translates to an aspect ratio of about 0.5. Higher aspect ratios are indicative of less round, more "pancakeshaped" clumps, which may be acceptable, if other benefits are gained (e.g., an increase in liquid absorption or a decrease in clumps sticking to the box).

The fibers can range in particle size from about 1 nm to about 6 inches (typically ranging between 1 nm and 5 mm) and generally are present in 0.1-50% by weight of the composite particles. The size and shape of the fibers chosen may aid in controlling the particle size and shape of the resulting composite particles. For example, it is expected that longer fibers will yield larger agglomerate particles and a blend of fiber lengths will yield composite particles of varying particle sizes.

U.S. Pat. No. 5,705,030 assigned to the United States Department of Agriculture, which is hereby incorporated by reference in its entirety, describes a process for converting chicken feathers into fibers. According to U.S. Pat. No. 5,705,030, feathers from all avian sources have the characteristics which are necessary for the production of useful fibers, therefore feathers from any avian species may be utilized. Feathers are made up of many slender, closely arranged parallel barbs forming a vane on either side of a tapering hollow shaft. The barbs have bare barbules which in turn bare barbicels commonly ending in hooked hamuli and interlocking with the barbules of an adjacent barb to link the barbs into a continuous vane.

Structurally, chicken feather fibers have naturally-occurring nodes approximately 50 microns apart. These nodes are potential cleavage sites for producing fibers of uniform 40-50 µm lengths. In addition, feathers from different species vary in length: poultry feather fibers are approximately 2 cm in length while those derived from exotic birds such as peacocks or ostriches are 4 to 5 cm or longer. Feather fibers are also thinner than other natural fibers resulting in products having a smooth, fine surface.

The composition of wood pulp fiber is generally about 50% cellulose with the remainder being lignin and hemicelluloses. Hardwood trees have broad leaves and softwood trees have needle-like or scale-like leaves. Hardwood trees have shorter fibers compared to softwood trees. All freshly cut wood contains moisture. Wood pulp has a tendency to be at "equilibrium density", i.e., the density at which the addition of more water does not swell or flatten the wood. If the wood pulp sheet is low density and water is added, it flattens out to equilibrium density. If the wood pulp sheet is high density, it swells to the equilibrium density.

Equilibrium density plays a significant role when agglomerated with an absorbent material suitable for use as a cat litter. While in an air stream, if the density of the wood pulp fiber is close to the density of the composite particles formed, a homogenous blend of fibers within the composite particles may be obtained. If there is a significant difference between the density of the wood pulp and the density of the composite particles formed, there is the possibility of fiber aggregation.

Wood pulp strength is directly proportional to fiber length and dictates its final use. A long fiber pulp is good to blend with short fiber pulp to optimize on fiber cost, strength and formation of paper. In general, pulp made from softwood trees or wood grown in colder climates have longer fibers compared to pulp made from hardwood trees or wood grown in warmer climates.

Processing conditions also contribute to fiber length. When made from the same wood, chemical pulps tend to have longer fibers compared to semi-chemical pulp and mechanical pulp. Examples of long fiber pulp (>10 mm) are cotton, hemp, flax and Jute. Examples of medium fiber pulp (2-10 mm) are Northern softwoods and hardwoods. Examples of short fiber pulp (<2 mm) are tropical hardwoods, straws and grasses.

The core mentioned above can also be considered an active, for example including a lightweight material dispersed throughout the particle to reduce the weight of the particle, a core made of pH-altering material, etc. A preferred embodiment is to bind actives directly to the surface of composite absorbent particles. The use of extremely low levels of actives bound only to the surface of absorbent particles leads to the following benefits:
1. the use of extremely small particle size of the active material results in a very high surface area of active while using a very small amount of active,
2. with actives present only on the surface of the substrate, the waste of expensive actives that would be found with 'homogeneous' composite particles [where actives are found throughout the substrate particles] is eliminated,
3. segregation of actives from substrates is eliminated; thus, the actives remain dispersed and do not end up on the bottom of the litter container,
4. by using very low levels of expensive actives, the cost of the product is greatly reduced,
5. binding of small particle size actives directly to the substrate surface results in lower dust levels than in bulk added product.

Surprisingly, low levels of PAC [0.2-0.3%] have been found to provide excellent odor control in cat litter when they are bound to the surface of a material such as sodium bentonite clay. For example, binding of small amounts of PAC particles to sodium bentonite substrate particles using xanthan gum or fibrillatable PTFE as binder results in litter materials with superior odor adsorbing performance. In this example, the PAC is highly effective at capturing malodorous volatile organic compounds as they escape from solid and liquid wastes due to the high surface area of the PAC, and its preferred location on the surface of the sodium bentonite particles.

Another aspect of the invention is the use of Encapsulated Actives, where the actives are positioned inside the particle, homogeneously and/or in layers. Because of the porous structure of the particles, even actives positioned towards the center of the particle are available to provide their particular functionality. Encapsulation of actives provides a slow release mechanism such that the actives are in a useful form for a longer period of time. This is particularly so where the active is used to reduce malodors.

In addition to liquid-absorbing clay materials, filler materials such as limestone, sand, calcite, dolomite, recycled waste materials, zeolites, silica gel and gypsum can also be incorporated with the clay materials to reduce the cost of the litter without significantly decreasing the material's performance as a litter.

Because clays are heavy, it may be desirable to reduce the weight of the composites to reduce shipping costs, reduce the amount of material needed to fill the same relative volume of the litter box, and to make the material easier for customers to carry. Exemplary light-weighting materials include but are not limited to perlite, expanded perlite, volcanic glassy materials having high porosities and low densities, vermiculite, expanded vermiculite, pumice, silica gels, opaline silica, tuff, and lightweight agricultural byproducts. When selecting a light-weighting material, the effect the light-weighting material will have on the litter's performance is an important consideration. Factors to evaluate include how the light-weighting material will effect cost, ease of manufacture, clumping, tracking, absorbency, odor control, sticking to the box, dust, etc. In some cases, the light-weighting materials may also be performance-enhancing.

One embodiment disclosed herein utilizes expanded perlite having a bulk density of 5 lb/ft3. Expanded perlites having bulk densities greater than 5 lb/ft3 may also be used. Perlite is a generic term for a naturally occurring siliceous rock. The distinguishing feature which sets perlite apart from other volcanic glasses is that when heated to a suitable point in its softening range, it expands from four to twenty times its original volume. This expansion is due to the presence of two to six percent combined water in the crude perlite rock. Firing, i.e., quickly heating to above 1600° F. (871° C.), causes the crude rock to pop in a manner similar to popcorn yielding a very open, highly porous structure referred to as expanded perlite. Once the perlite is expanded, it can then be gently crushed to form materials having varying structural properties. The perlite can be obtained either expanded or unexpanded and the firing step can be performed on site prior to agglomeration. Significant cost savings in shipping can result from expanding the perlite on site.

A particular source of perlite is Kansas Minerals. Perlite obtained from Kansas Minerals is believed to be somewhat physically unique after being popped. It is expected that hollow spheres are formed during the firing process, however, when the Kansas Minerals material is examined under a microscope, it appears as though only a portion of the material comprises hollow spheres. The other portion comprises broken spheres. Without being bound by any particular theory, it is possible that the wall thickness of the expanded perlite spheres initially formed through the firing process are very thin and thus, tend to break apart. Whatever the cause of this physical property, it is believed to result in a material that is particularly well suited for use in the agglomeration processes of the present invention. The combination of approximately 50/50 hollow spheres to broken spheres has been observed to perform particularly well.

A source of expanded volcanic ash is Harborlite World Minerals. Expanded volcanic ash from Harborlite has a bulk density of about 3 lb/ft3 and has also been successfully incorporated into agglomerated absorbent materials.

Another suitable, expandable mineral similar to perlite is vermiculite. In all examples containing expanded perlite, expanded vermiculite could be substituted for the perlite with similar results expected. Although geological differences may exist between expanded perlite and expanded volcanic ash (and perlite and volcanic ash), the two terms are synonymously used herein.

Various embodiments of the present invention utilize light-weighting materials having the following mean particle diameters: about 1500 microns or less; about 500 microns or less; ranging from about 1 to about 100 microns.

Using the above lightweight materials, a bulk density reduction of 10-50% can be achieved relative to generally solid particles of the absorbent clay material (e.g., as mined). For example, composites in which sodium bentonite (Black Hills Bentonite, Mills, Wyo.) is the absorbent clay material (bulk density 67 lb/ft3), using about 17% of expanded perlite, e.g., Kamco 5, (Kansas Minerals, Mancato, Kans.) having a bulk density of 5 lb/ft3 results in up to a 53% bulk density reduction. Using roughly 13% of the 5 lb/ft3 expanded perlite results in about a 43% reduction in bulk density. Using roughly 5% of the 5 lb/ft3 expanded perlite results in about a 37% reduction in bulk density.

The bulk density of the composites formed can be adjusted by manipulating the agglomeration process to increase or decrease pore size within the particle.

Heavyweight materials may be added to the absorbent material when it is desirable to have heavier particles. Heavy particles may be useful, for example, when the particles are used in an outdoor application in which high winds could blow the particles away from the target zone. Heavier particles also produce an animal litter that is less likely to be tracked out of a litter box. Illustrative heavyweight materials include but are not limited to sand, iron filings, etc.

Pan Agglomeration and Other Particle Creation Processes

The agglomeration process in combination with the unique materials used allows the manufacturer to control the physical properties of particles, such as bulk density, dust, strength, as well as PSD (particle size distribution) without changing the fundamental composition and properties of absorbent particles.

One benefit of the pan agglomeration process of the present invention is targeted active delivery, i.e., the position of the active can be "targeted" to specific areas in, on, and/or throughout the particles. Another benefit is that because the way the absorbent particles are formed is controllable, additional benefits can be "engineered" into the absorbent particles, as set forth in more detail below.

As absorbent clay(s) is a preferred absorbent material, much of the discussion will involve the use of absorbent clay(s). However, it should be kept in mind that other absorbent materials suitable for use as animal litter may be used in place of the absorbent clay(s) discussed herein.

Figure 2:
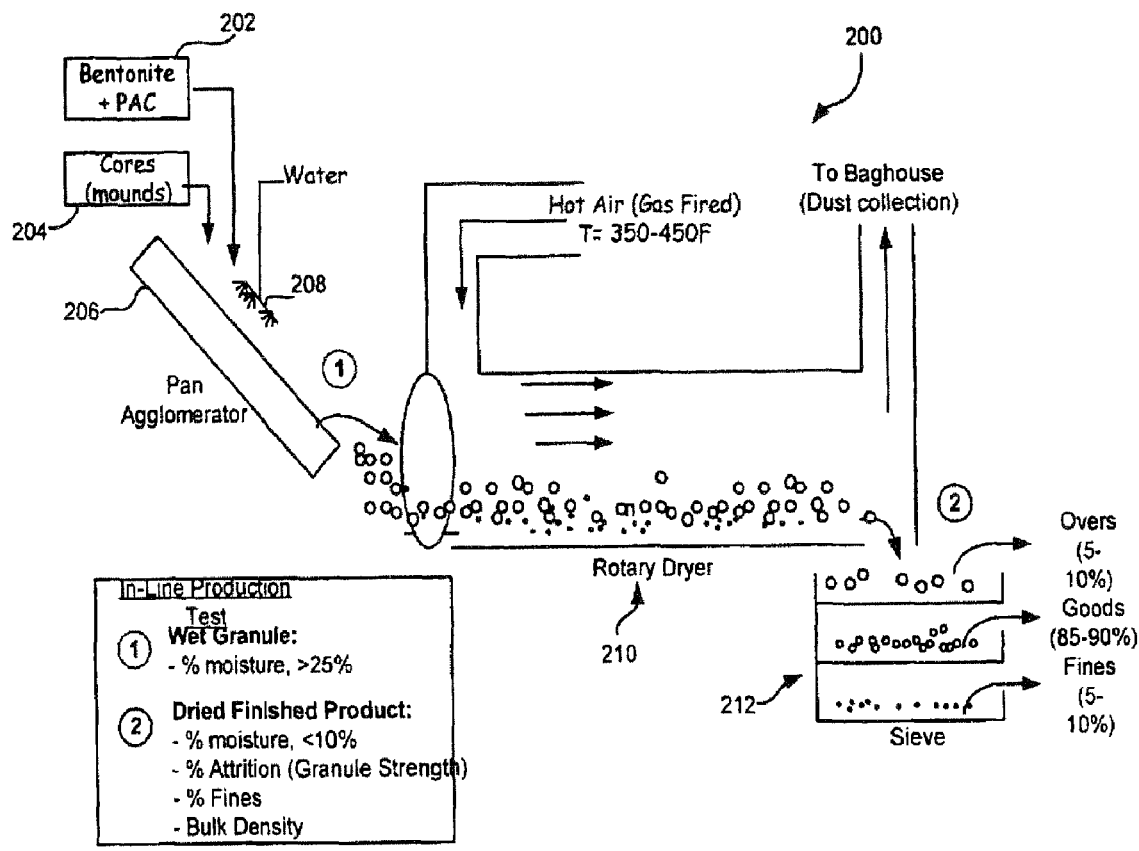
FIG. 2 is a process diagram illustrating a pan agglomeration process according to a preferred embodiment.

FIG. 2 is a process diagram illustrating a pan agglomeration process 200 according to a preferred embodiment. In this example, the absorbent granules are bentonite clay and the active is PAC. Cores of a suitable material, here calcium bentonite clay, are also added. The absorbent particles (e.g., bentonite powder) is mixed with the active (e.g., PAC) to form a dry mixture, which is stored in a hopper 202 from which the mixture is fed into the agglomerator 206. Alternatively, the absorbent granules and active(s) may be fed to the agglomerator individually. For example, liquid actives can be added by a sprayer. The cores are preferably stored in another hopper 204, from which they are fed into the agglomerator. A feed curtain can be used to feed the various materials to the agglomerator.

Figure 3:
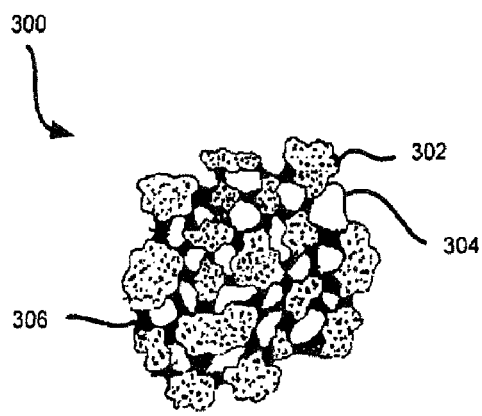
FIG. 3 depicts the structure of an illustrative agglomerated composite particle formed by the process of FIG. 2.

In this example, the agglomerator is a pan agglomerator. The pan agglomerator rotates at a set or variable speed about an axis that is angled from the vertical. Water and/or binder is sprayed onto the granules in the agglomerator via sprayers 208 to raise/maintain the moisture content of the particles at a desired level so that they stick together. Bentonite acts as its own binder when wetted, causing it to clump, and so additional binder is not be necessary. The pan agglomeration process gently forms composite particles through a snowballing effect broadly classified by experts as natural or tumble growth agglomeration. FIG. 3 depicts the structure of an illustrative agglomerated composite particle 300 formed during the process of FIG. 2. As shown, the particle includes granules of absorbent material 302 and active 304 with moisture 306 or binder positioned interstitially between the granules.

Depending on the pan angle and pan speed, the particles tumble off upon reaching a certain size. Thus, the pan angle and speed controls how big the particles get. The particles are captured as they tumble from the agglomerator. The particles are then dried to a desired moisture level by any suitable mechanism, such as a rotary or fluid bed. In this example, a forced air rotary dryer 210 is used to lower the high moisture content of the particles to less than about 15% by weight and ideally about 8-13% by weight. At the outlet of the rotary dryer, the particles are screened with sieves 212 or other suitable mechanism to separate out the particles of the desired size range. Tests have shown that about 80% or more of the particles produced by pan agglomeration will be in the desired particle size range. Preferably, the yield of particles in the desired size range is 85% or above, and ideally 90% or higher. The selected particle size range can be in the range of about 10 mm to about 100 microns, and preferably about 2.5 mm or less. An illustrative desired particle size range is 12×40 mesh (1650-400 microns).

The exhaust from the dryer is sent to a baghouse for dust collection. Additional actives such as borax and fragrance can be added to the particles at any point in the process before, during and/or after agglomeration. Also, additional/different actives can be dry blended with the particles.

Illustrative composite absorbent particles after drying have a specific weight of from about 0.15 to about 1.2 kilograms per liter and a liquid absorbing capability of from about 0.6 to about 2.5 liters of water per kilogram of particles. Preferably, the particles absorb about 50% or more of their weight in moisture, more preferably about 75% or more of their weight in moisture, even more preferably greater than approximately 80% and ideally about 90% or more of their weight in moisture.

Specific examples of compositions that can be fed to the agglomerator using the process of FIG. 2 include (in addition to effective amounts of active):
  100% Bentonite Powder
  67% Calcium Bentonite Clay (core) & 33% Bentonite Powder
  50% Calcium Bentonite Clay (core) & 50% Bentonite Powder
  Perlite (core) & Bentonite Powder
  Sand (core) & Bentonite Powder Table 1 lists illustrative properties for various compositions of particles created by a 20" pan agglomerator at pan angles of 40-60 degrees and pan speeds of 20-50 RPM. The total solids flow rates into the pan were 0.2-1.0 kg/min.

TABLE 1

| Core | Water | Bentonite to Core Ratio | Final Moisture | Bulk Density (kg/l) | Clump Strength |
|---|---|---|---|---|---|
| None | 15-23% | 100:0 | 1.0-1.4% | 0.70-0.78 | 95-97 |
| Calcium bentonite | 15-23 | 50:50 | 3.4 | 0.60-0.66 | 95-97 |
| Calcium Bentonite | | | | | |
| Calcium Bentonite | | | | | |
| Calcium Bentonite | | | | | |
| Calcium bentonite | 15-18 | 33:67 | 4.3-4.4 | 0.57-0.60 | 93-95 |
| Calcium Bentonite | | | | | |
| Calcium Bentonite | | | | | |
| Calcium Bentonite | | | | | |
| Sand | 10-12 | 50:50 | 2.0 | 0.81-0.85 | 97-98 |
| Sand | 6-8 | 33:67 | 1.6-2.4 | 0.92 | 97 |
| Perlite | 15-19% | 84:16 | | 0.36-0.39 | 97% |
| Perlite | 16-23% | 76:24 | | 0.27-0.28 | 95-97% |

Clump strength is measured by first generating a clump by pouring 10 ml of pooled cat urine (from several cats so it is not cat specific) onto a 2 inch thick layer of litter. The urine causes the litter to clump. The clump is then placed on a ½" screen after a predetermined amount of time (e.g., 6 hours) has passed since the particles were wetted. The screen is agitated for 5 seconds with the arm up using a Ro-Tap Mechanical Sieve Shaker made by W.S. Tyler, Inc. The percentage of particles retained in the clump is calculated by dividing the weigh of the clump after agitation by the weight of the clump before agitation. Referring again to the Table 1 above, note that the clump strength indicates the percentage of particles retained in the clump after 6 hours. As shown, >90%, and more ideally, >95% of the particles are retained in a clump after 6 hours upon addition of an aqueous solution, such as deionized water or animal urine. Note that $\geq$ about 80% particle retention in the clump is preferred. Also, note the reduction in bulk density when a core of calcium bentonite clay or perlite is used.

Figure 4:
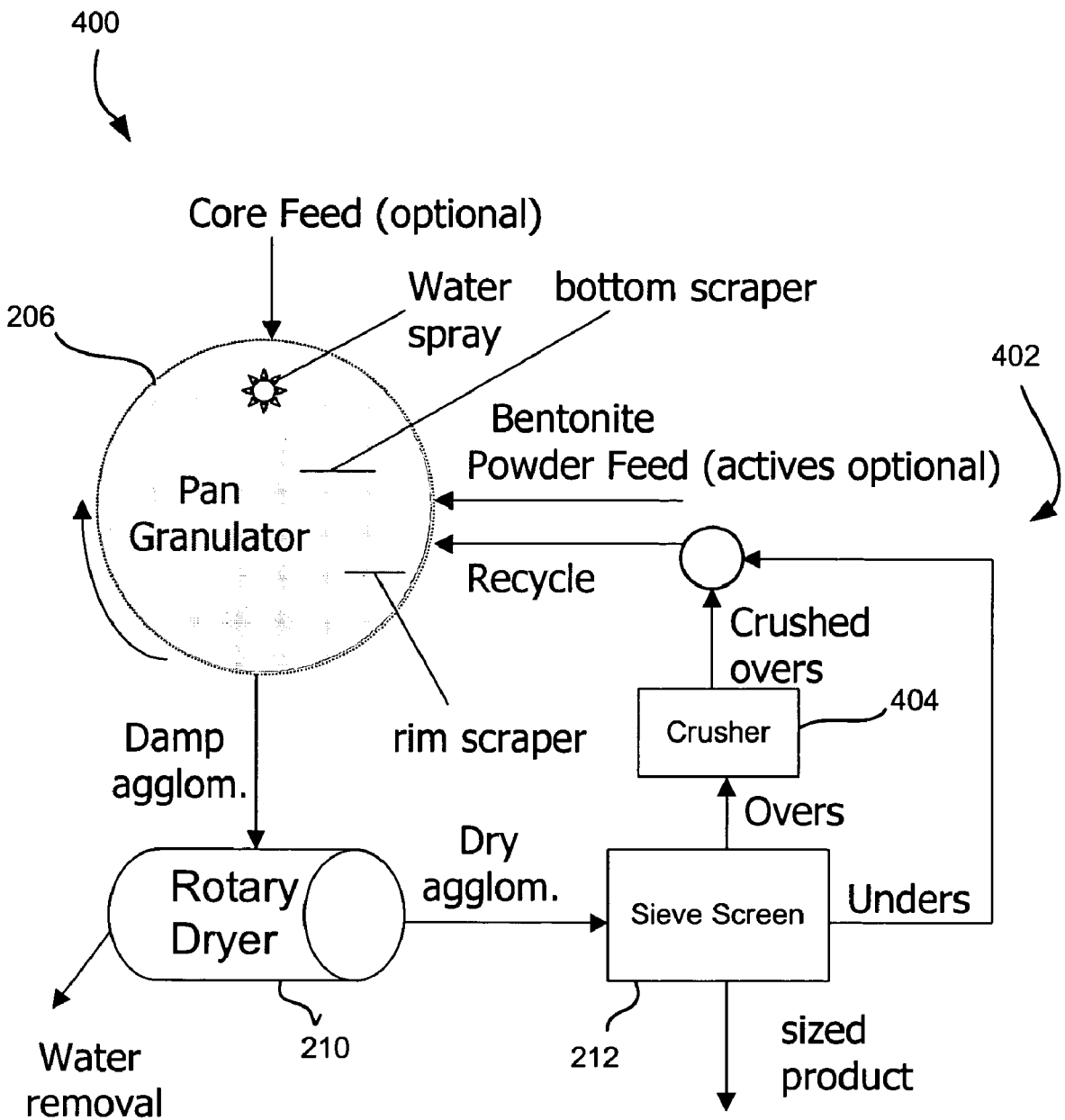
FIG. 4 is a process diagram illustrating another exemplary pan agglomeration process with a recycle subsystem.

FIG. 4 is a process diagram illustrating another exemplary pan agglomeration process 400 with a recycle subsystem 402. Save for the recycle subsystem, the system of FIG. 4 functions substantially the same as described above with respect to FIG. 2. As shown in FIG. 4, particles under the desired size are sent back to the agglomerator. Particles over the desired size are crushed in a crusher 404 and returned to the agglomerator.

The diverse types of clays and mediums that can be utilized to create absorbent particles should not be limited to those cited above. Further, unit operations used to develop these particles include but should not be limited to: high shear agglomeration processes, low shear agglomeration processes, high pressure agglomeration processes, low pressure agglomeration processes, mix mullers, roll press compacters, pin mixers, batch tumble blending mixers (with or without liquid addition), and rotary drum agglomerators. For simplicity, however, the larger portion of this description shall refer to the pan agglomeration process, it being understood that other processes could potentially be utilized with similar results.

Figure 5:
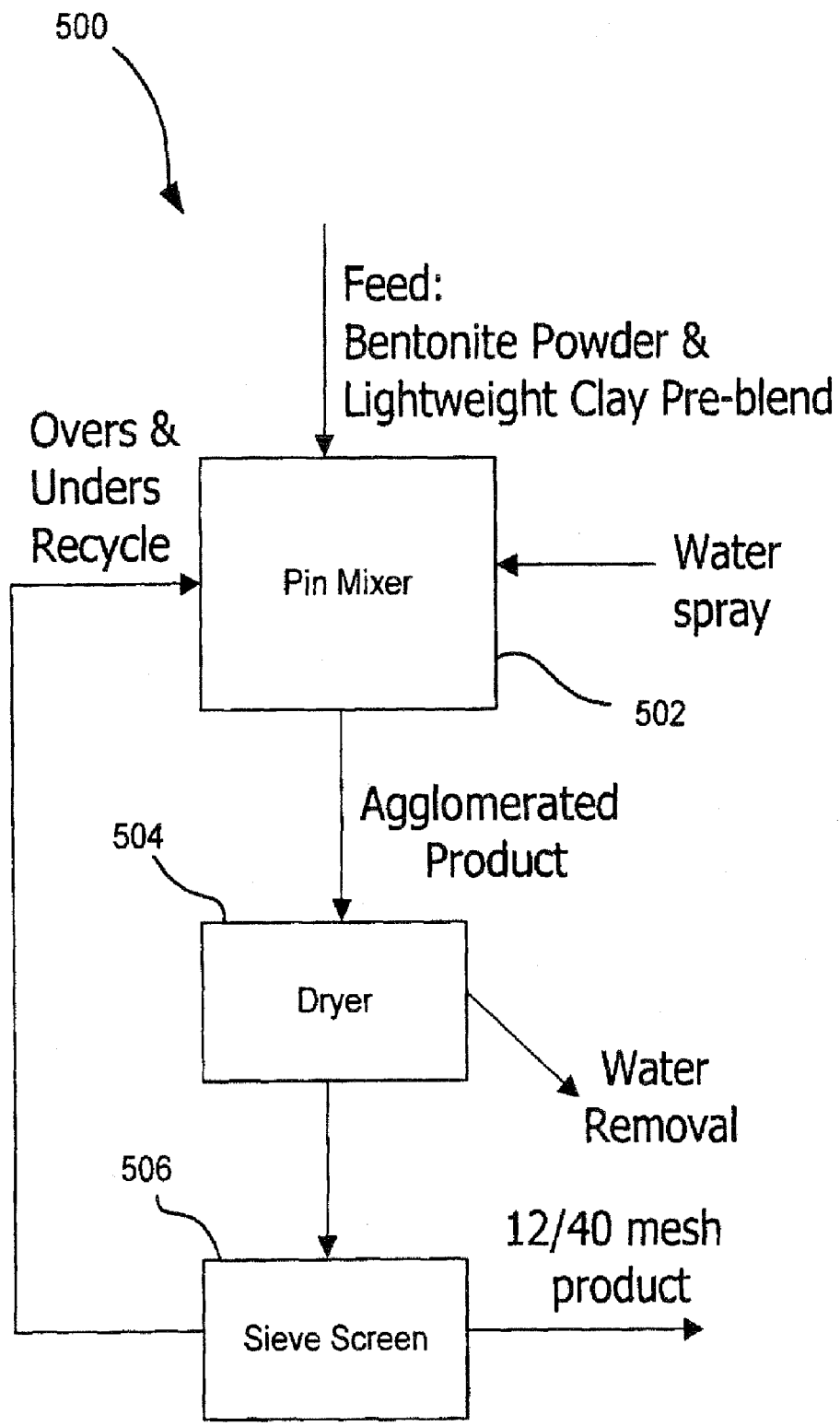
FIG. 5 is a process diagram illustrating an exemplary pin mixer process for forming composite absorbent particles.

FIG. 5 is a process diagram illustrating an exemplary pin mixer process 500 for forming composite absorbent particles. As shown, absorbent particles and active are fed to a pin mixer 502. Water is also sprayed into the mixer. The agglomerated particles are then dried in a dryer 504 and sorted by size in a sieve screen system 506. Table 2 lists illustrative properties for various compositions of particles created by pin mixing.

TABLE 2

| Lightweight Clay | Bentonite to Clay Ratio (wt %) | Water Addition (wt %) | Bulk Density (lb/ft$^3$) | Clump Strength - 6 hours (% Retained) |
|---|---|---|---|---|
| Zeolite (39 lb/ft$^3$) | 50:50 | 20 | 59 | 91 |
| Bentonite (64 lb/ft$^3$) | 100:0 | 20 | 67 | 95 |

Figure 6:
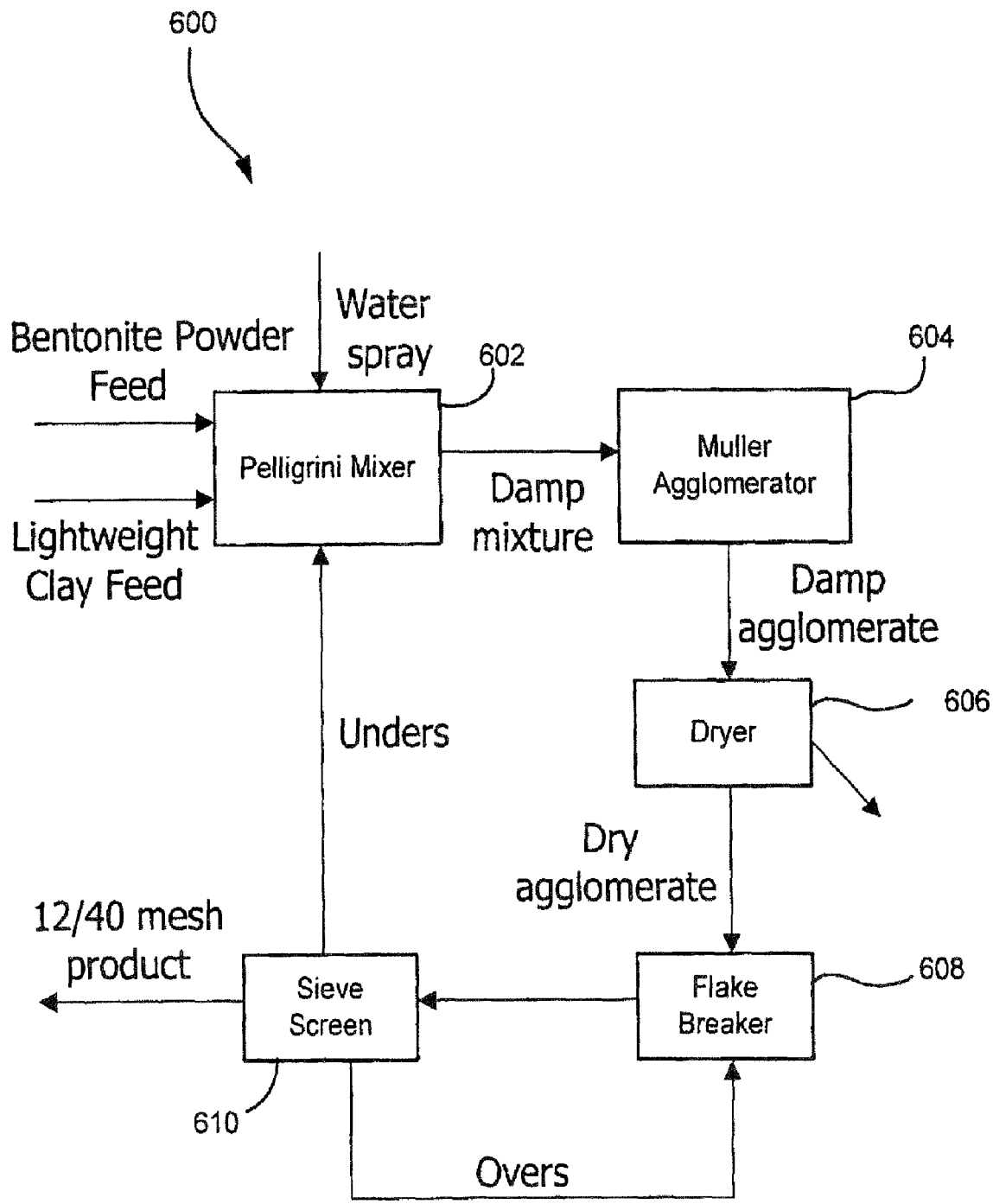
FIG. 6 is a process diagram illustrating an exemplary mix muller process for forming composite absorbent particles.

FIG. 6 is a process diagram illustrating an exemplary mix muller process 600 for forming composite absorbent particles. As shown, the various components and water and/or binder are added to a pellegrini mixer 602. The damp mixture is sent to a muller agglomerator 604 where the mixture is agglomerated. The agglomerated particles are dried in a dryer 606, processed in a flake breaker 608, and then sorted by size in a sieve screen system 610.

Table 3 lists illustrative properties for various compositions of particles created by a muller process. Note that the moisture content of samples after drying is 2-6 weight percent.

TABLE 3

| Clay | Bentonite:Clay (wt %) | Water Addition (wt %) | Calculated Bulk Density (lb/ft³) | Actual Bulk Density (lb/ft³) | Clump Strength - 6 hours (% Retained) | Dust (mg) |
| --- | --- | --- | --- | --- | --- | --- |
| GWC (32 lb/ft³) | 50:50 | 33 | 43 | 45 | 83 | 39 |
| GWC (32 lb/ft³) | 50:50 | 47 | 43 | 42 | 56 | 34 |
| Taft DE (22 lb/ft³) | 50:50 | 29 | 33 | 46 | 86 | 38 |
| Taft DE (22 lb/ft³) | 50:50 | 41 | 33 | 43 | 76 | 35 |

The composite absorbent particle can be formed into any desired shape. For example, the particles are substantially spherical in shape when they leave the agglomeration pan. At this point, i.e., prior to drying, the particles have a high enough moisture content that they are malleable. By molding, compaction, or other processes known in the art, the composite absorbent particle can be made into non-spherical shapes such as, for example, ovals, flattened spheres, hexagons, triangles, squares, etc. and combinations thereof.

Example 1

Referring again to FIG. 1, a method for making particles 102 is generally performed using a pan agglomeration process in which clay particles of ≦200 mesh (≦74 microns), preferably ≦325 mesh (≦43 microns) particle size premixed with particles of active, are agglomerated in the presence of an aqueous solution to form particles in the size range of about 12×40 mesh (about 1650-250 microns). Alternatively, the particles are first formed with clay alone, then reintroduced into the pan or tumbler, and the active is added to the pan or tumbler, and a batch run is performed in the presence of water or a binder to adhere the active to the surface of the particles. Alternatively, the active can be sprayed onto the particles.

Example 2

A method for making particles 104 is generally performed using the process described with relation to FIG. 2, except no core material is added.

Example 3

A method for making particles 106 is generally performed using the process described with relation to FIG. 2, except that introduction of the absorbent granules and the active into the agglomerator are alternated to form layers of each.

Example 4

A method for making particles 108 is generally performed using the process described with relation to FIG. 2, except that the active has been pre-clumped using a binder, and the clumps of active are added. Alternatively, particles of absorbent material can be created by agglomeration and spotted with a binder such that upon tumbling with an active, the active sticks to the spots of binder thereby forming concentrated areas. Yet another alternative includes the process of pressing clumps of active into the absorptive material.

Example 5

A method for making particles 110 is generally performed using the process described with relation to FIG. 2.

Example 6

A method for making particles 112 is generally performed using the process described with relation to FIG. 2.

Example 7 & 8

A method for making particles 114 and 116 are generally performed using the process described with relation to FIG. 2, except no active is added.

In addition, the performance-enhancing active can be physically dispersed along pores of the particle by suspending an insoluble active in a slurry and spraying the slurry onto the particles. The suspension travels into the pores and discontinuities, depositing the active therein.

Control Over Particle Properties

Strategically controlling process and formulation variables along with agglomerate particle size distribution allows for the development of various composite particles engineered specifically to "dial in" attribute improvements as needed. Pan agglomeration process variables include but are not limited to raw material and ingredient delivery methods, solid to process water mass ratio, pan speed, pan angle, scraper type and configuration, pan dimensions, throughput, and equipment selection. Formulation variables include but are not limited to raw material specifications, raw material or ingredient selection (actives, binders, clays and other solids media, and liquids), formulation of liquid solution used by the agglomeration process, and levels of these ingredients.

The pan agglomeration process intrinsically produces agglomerates with a narrow particle size distribution (PSD). The PSD of the agglomerates can be broadened by utilizing a pan agglomerator that continuously changes angle (pivots back and forth) during the agglomeration process. For instance, during the process, the pan could continuously switch from one angle, to a shallower angle, and back to the initial angle or from one angle, to a steeper angle, and back to the initial angle. This variable angle process would then repeat in a continuous fashion. The angles and rate at which the pan continuously varies can be specified to meet the operator's desired PSD and other desired attributes of the agglomerates.

By knowledge of interactions between pan, dryer, and formulation parameters one could further optimize process control or formulation/processing cost. For example, it was noted that by addition of a minor content of a less absorptive clay, we enabled easier process control of particle size. For example, by addition of calcium bentonite clay the process became much less sensitive to process upsets and maintains consistent yields in particle size throughout normal moisture variation. Addition of calcium bentonite clay also helped reduce particle size even when higher moisture levels were used to improve granule strength. This is of clear benefit as one looks at enhancing yields and having greater control over particle size minimizing need for costly control equipment or monitoring tools.

For those practicing the invention, pan agglomeration manipulation and scale-up can be achieved through an empirical relationship describing the particle's path in the pan. Process factors that impact the path the particle travels in the pan include but are not limited to pan dimensions, pan speed, pan angle, input feed rate, solids to process liquid mass ratio, spray pattern of process liquid spray, position of scrapers, properties of solids being processed, and equipment selection. Additional factors that may be considered when using pan agglomerators include particle to particle interactions in the pan, gravity effects, and the following properties of the particles in the pan: distance traveled, shape of the path traveled, momentum, rotational spin about axis, shape, surface properties, and heat and mass transfer properties.

The composite particles provide meaningful benefits, particularly when used as a cat litter, that include but are not limited to improvements in final product attributes such as odor control, litter box maintenance benefits, reduced dusting or sifting, and consumer convenience. As such, the following paragraphs shall discuss the composite absorbent particles in the context of animal litter, it being understood that the concepts described therein apply to all embodiments of the absorbent particles.

Significant odor control improvements over current commercial litter formulas have been identified for, but are not limited to, the following areas:

Fecal odor control (malodor source: feline feces)
Ammonia odor control (malodor source: feline urine)
Non-ammonia odor control (malodor source: feline urine)

Odor control actives that can be utilized to achieve these benefits include but are not limited to powdered activated carbon, silica powder (Type C), borax pentahydrate, and bentonite powder. The odor control actives are preferably distributed within and throughout the agglomerates by preblending the actives in a batch mixer with clay bases and other media prior to the agglomeration step. The pan agglomeration process, in conjunction with other unit operations described here, allows for the targeted delivery of actives within and throughout the agglomerate, in the outer volume of the agglomerate with a rigid core, on the exterior of the agglomerate, etc. These or any targeted active delivery options could also be performed in the pan agglomeration process exclusively through novel approaches that include, but should not be limited to, strategic feed and water spray locations, time delayed feeders and spray systems, raw material selection and their corresponding levels in the product's formula (actives, binders, clays, and other medium), and critical pan agglomeration process variables described herein.

Additionally, the pan agglomeration process allows for the incorporation of actives inside each agglomerate or granule by methods including but not limited to dissolving, dispersing, or suspending the active in the liquid solution used in the agglomeration process. As the pan agglomeration process builds the granules from the inside out, the actives in the process's liquid solution become encapsulated inside each and every granule. This approach delivers benefits that include but should not be limited to reduced or eliminated segregation of actives from base during shipping or handling (versus current processes that simply dry tumble blend solid actives with solid clays and medium), reduced variability in product performance due to less segregation of actives, more uniform active dispersion across final product, improved active performance, and more efficient use of actives. This more effective use of actives reduces the concentration of active required for the active to be effective, which in turn allows addition of costly ingredients that would have been impractical under prior methods. For example, dye or pigment can be added to vary the color of the litter, lighten the color of the litter, etc. Disinfectant can also be added to kill germs. For example, this novel approach can be utilized by dissolving borax pentahydrate in water. This allows the urease inhibitor (boron) to be located within each granule to provide ammonia odor control and other benefits described here. One can strategically select the proper actives and their concentrations in the liquid solution used in the process to control the final amount of active available in each granule of the product or in the product on a bulk basis to deliver the benefits desired.

Targeted active delivery methods should not be limited to the targeted active delivery options described here or to odor control actives exclusively. For example, another class of active that could utilize this technology is animal health indicating actives such as a pH indicator that changes color when urinated upon, thereby indicating a health issue with the animal. This technology should not be limited to cat litter applications. Other potential industrial applications of this technology include but should not be limited to laundry, home care, water filtration, fertilizer, iron ore pelletizing, pharmaceutical, agriculture, waste and landfill remediation, and insecticide applications. Such applications can utilize the aforementioned unit operations like pan agglomeration and the novel process technologies described here to deliver smart time-releasing actives or other types of actives and ingredients in a strategic manner. The targeted active delivery approach delivers benefits that include but should not be limited to the cost efficient use of actives, improvements in active performance, timely activation of actives where needed, and improvements in the consumer perceivable color of the active in the final product. One can strategically choose combinations of ingredients and targeted active delivery methods to maximize the performance of actives in final products such as those described here.

Litter box maintenance improvements can be attributed to proper control of the product's physical characteristics such as bulk density, clump strength, attrition or durability (granule strength), clump height (reduction in clump height has been found to correlate to reduced sticking of litter to the bottom of litter box), airborne and visual dust, lightweight, absorption (higher absorption correlates to less sticking to litter box—bottom, sides, and corners), adsorption, ease of scooping, ease of carrying and handling product, and similar attributes. Strategically controlling process and formulation variables along with agglomerate particle size distribution allows for the development of various cat litter particles engineered specifically to "dial in" attribute improvements as needed. Pan agglomeration process variables include but are not limited to raw material and ingredient delivery methods, solid to process water mass ratio, pan speed, pan angle, scraper type and configuration, pan dimensions, throughput, and equipment selection. Formulation variables include but are not limited to raw material specifications, raw material or ingredient selection (actives, binders, clays and other solids medium, and liquids), formulation of liquid solution used by the agglomeration process, and levels of these ingredients. For example, calcium bentonite can be added to reduce sticking to the box.

Improvements in consumer convenience attributes include but are not limited to those described here and have been linked to physical characteristics of the product such as bulk density or light weight. Because the absorbent particles are made from small granules, the pan agglomeration process creates agglomerated particles having a porous structure that causes the bulk density of the agglomerates to be lower than its initial particulate form. Further, by adjusting the rotation speed of the pan, porosity can be adjusted. In particular, a faster pan rotation speed reduces the porosity by compressing the particles. Since consumers use products like cat litter on a volume basis, the pan agglomeration process allows the manufacturer to deliver bentonite based cat litters at lower package weights but with equivalent volumes to current commercial litters that use heavier clays that are simply mined, dried, and sized. The agglomerates' reduced bulk density also contributes to business improvements previously described such as cost savings, improved logistics, raw material conservation, and other efficiencies. Lightweight benefits can also be enhanced by incorporating cores that are lightweight. A preferred bulk density of a lightweight litter according to the present invention is less than about 1.5 grams per cubic centimeter and more preferably less than about 0.85 g/cc. Even more preferably, the bulk density of a lightweight litter according to the present invention is between about 0.25 and 0.85 g/cc, and ideally for an animal litter 0.35 and 0.50 g/cc.

The porous structure of the particles also provides other benefits. The voids and pores in the particle allow access to active positioned towards the center of the particle. This increased availability of active significantly reduces the amount of active required to be effective. For example, in particles in which carbon is incorporated in layers or heterogeneously throughout the particle, the porous structure of the absorbent particles makes the carbon in the center of the particle available to control odors. Many odors are typically in the gas phase, so odorous molecules will travel into the pores, where they are adsorbed onto the carbon. By mixing carbon throughout the particles, the odor-absorbing life of the particles is also increased. This is due to the fact that the agglomeration process allows the manufacturer to control the porosity of particle, making active towards the center of the particle available.

Figure 7:
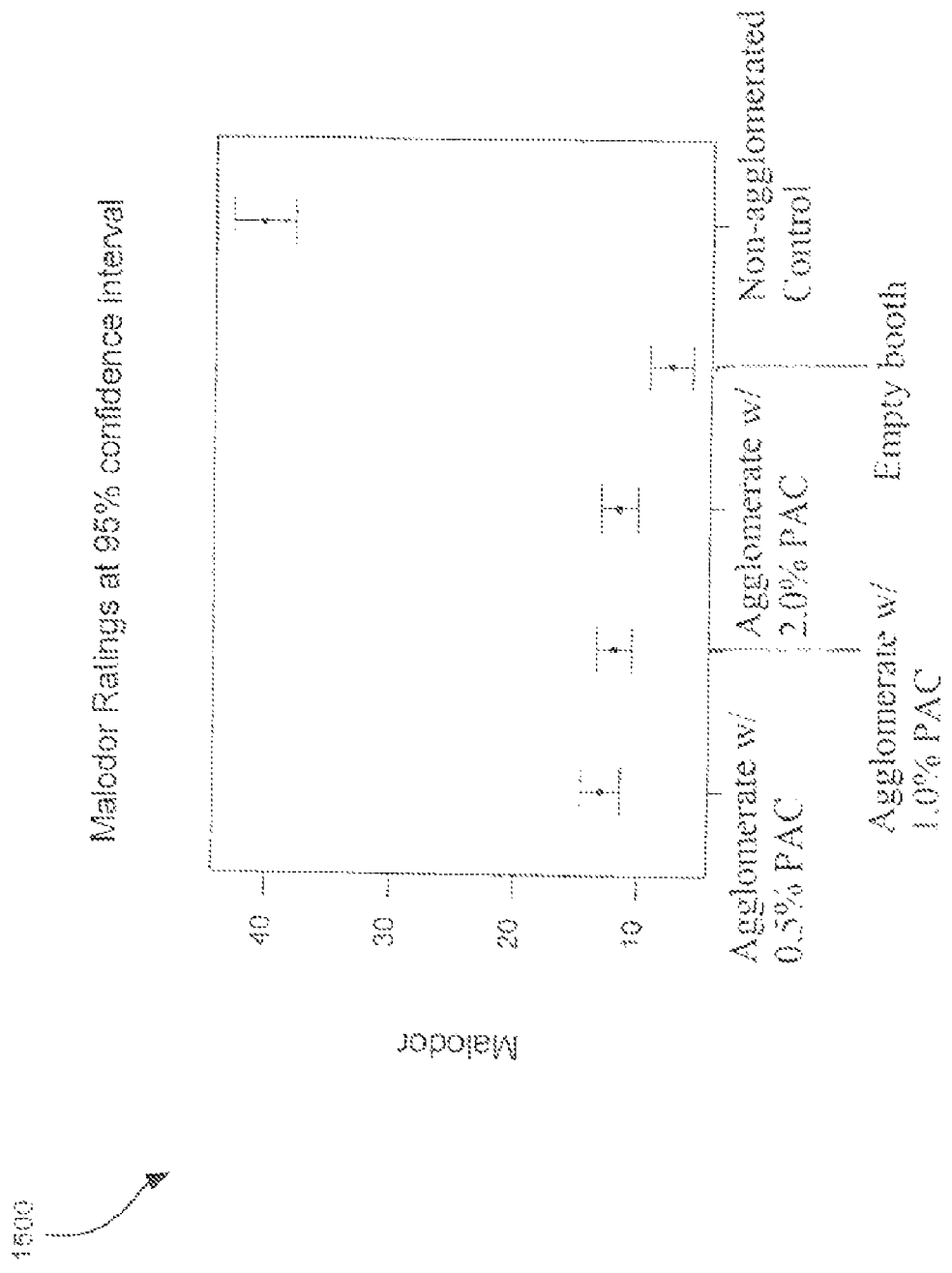
FIG. 7 is a graph depicting malodor ratings.

Because of the unique processing of the absorbent particles of the present invention, substantially every absorbent particle contains carbon. As discussed above, other methods merely mix GAC with clay, and compress the mixture into particles, resulting in aggregation and some particles without any carbon. Thus, more carbon must be added. Again, because of the way the particles are formed and the materials used (small clay granules and PAC), lower levels of carbon are required to effectively control odors. In general, the carbon is present in the amount of 5% or less based on the weight of the particle. In illustrative embodiments, the carbon is present in the amount of 1.0% or less, 0.5% or less, and 0.3% or less, based on the weight of the particle. This lower amount of carbon significantly lowers the cost for the particles, as carbon is very expensive compared to clay. The amount of carbon required to be effective is further reduced because the agglomeration process incorporates the carbon into each particle, using it more effectively. As shown in the graph 700 of FIG. 7, the composite absorbent particles according to a preferred embodiment have a malodor rating below about 15, whereas the non-agglomerated control has a rating of about 40, as determined by a Malodor Sensory Method.

Description of Malodor Sensory Method:
1. Cat boxes are filled with 2,500 cc of test litter.
2. Boxes are dosed each morning for four days with 30 g of pooled feces.
3. On the fourth day the center of each box is dosed with 20 ml pooled urine.
4. The boxes into sensory evaluation booths.
5. The boxes are allowed to equilibrate in the closed booths for 30-45 minutes before panelist evaluation.
6. The samples are then rated on a 60 point line scale by trained panelists.

Preferably, the agglomerated particles exhibit noticeably less odor after four days from contamination with animal waste as compared to a generally solid particle of the absorbent material alone under substantially similar conditions.

The composite absorbent particles of the present invention exhibit surprising additional features heretofore unknown. The agglomerated composite particles allow specific engineering of the particle size distribution and density, and thereby the clump aspect ratio. Thus, hydraulic conductivity (K) values of $\leq 0.25$ cm/s as measured by the following method can be predicted using the technology disclosed herein, resulting in a litter that prevents seepage of urine to the bottom of the box when sufficient litter is present in the box.

Method for measuring Hydraulic Conductivity Materials:
1. Water-tight gas drying tube with 7.5 centimeter diameter
2. Manometer
3. Stop watch
4. 250 ml graduated cylinder Procedure:
1. Mix and weigh sample
2. Pour the sample into the Drying tube until the total height of the sample is 14.6 centimeters.
3. Close the cell.
4. Use vacuum to pull air through and dry the sample for at least 3 minutes.
5. When the sample is dry, saturate the sample slowly with water by opening the inlet valve.
6. Allow the water exiting the drying tube to fill the graduated cylinder.
7. Deair the system using vacuum, allowing the system to stabilize for 10 minutes.
8. After 10 minutes, record the differential pressure as displayed by the manometer.
9. Record at least 4 differential pressure measurements, waiting 3 minutes between each measurement.
10. Record the flow rate of the water entering the graduated cylinder.
11. Calculate the Hydraulic Conductivity, K, using Darcy's Law $$Q = -KA(ha-hb)/L$$

Q=Flow Rate
K=Hydraulic Conductivity
A=Cross Sectional Area
L=Bed Length
Ha−Hb=Differential Pressure One of the distinguishing characteristics of the optimum K value is a litter clump with a very low height to length ratio (flat). By controlling the particle size of the litter, clump strength and clump profile can be controlled. This is important because the smaller the clumps are, the less likely they are to stick to something like the animal or litterbox. For instance, with prior art compacted litter, if a cat urinates 1 inch from the side of the box, the urine will penetrate to the side of box and the clay will stick to the box. However, the present invention allows the litter particles to be engineered so urine only penetrates about ½ inch into a mass of the particles.

Agglomerated composite particles according to the present invention also exhibit interesting clumping action not previously seen in the literature. Particularly, the particles exhibit extraordinary clump strength with less sticking to the box, especially in composite particles containing bentonite and PAC. PAC is believed to act as a release agent to reduce sticking to the box. However, intuitively this should also lead to reduced clump strength, not increased clump strength. The combination of stronger clumps yet exhibiting less sticking to the box is both surprising and counter-intuitive. The result is a litter with multiple consumer benefits including strong clumps, low urine seepage, and little sticking to the box.

Figure 8:
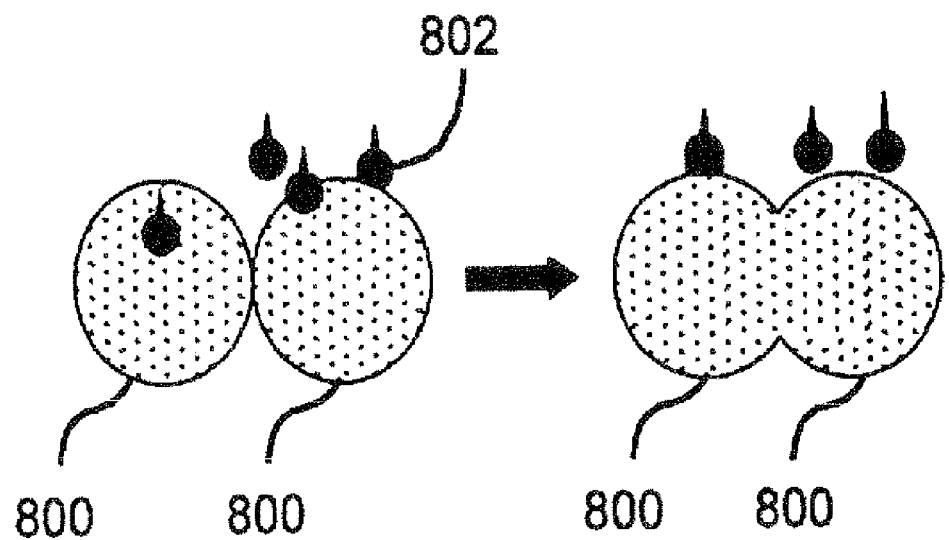
FIG. 8 depicts the clumping action of composite absorbent particles according to a preferred embodiment.
Figure 9:
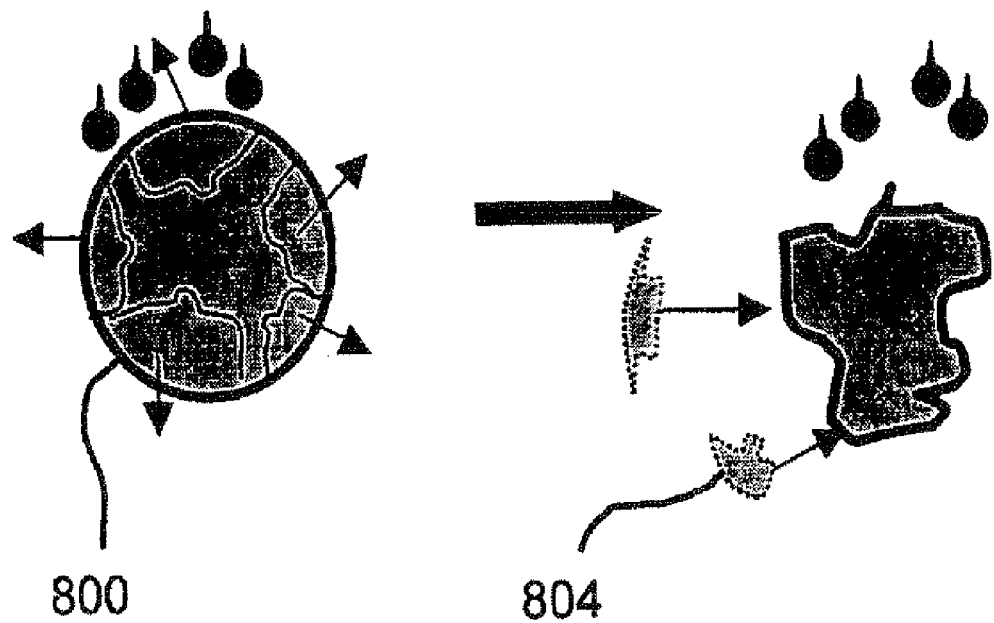
FIG. 9 depicts disintegration of a composite absorbent particle according to a preferred embodiment.

While not wishing to be bound by any particular theory, the increased clump strength is believed to be due to at least some of the PAC-containing granules "falling apart" and releasing their bentonite particles to reorder themselves, and this 'reordering' produces a stronger clump. As shown in FIGS. 8 and 9, this can best be described as a disintegration of more-water-soluble pieces of the agglomerated composite particles 800 when in contact with moisture 802, allowing the pieces 804 of the particles to attach to surrounding particles. This "reordering" produces a stronger clump. In testing, the visual appearance of the cores is a signal that at least some of the granules decompose to smaller particles, and these particles are "suspending" in the urine and are free to occupy interstitial spaces between particles, forming a stronger clump. This creates a network of softened agglomerated particles where broken particle pieces are attaching to others and creating a web of clumped material. Note however that the particles described herein should not be limited to clumping or scoopable particles.

As mentioned above, the composite absorbent particles have particular application for use as an animal litter. The litter would then be added to a receptacle (e.g., litterbox) with a closed bottom, a plurality of interconnected generally upright side walls forming an open top and defining an inside surface. However, the particles should not be limited to pet litters, but rather could be applied to a number of other applications such as:

Litter Additives—Formulated product can be pre-blended with standard clumping or non-clumping clays to create a less expensive product with some of the benefits described herein. A post-additive product could also be sprinkled over or as an amendment to the litter box.

Filters—Air or water filters could be improved by either optimizing the position of actives into areas of likely contact, such as the outer perimeter of a filter particle. Composite particles with each subcomponent adding a benefit could also be used to create multi-functional composites that work to eliminate a wider range of contaminants.

Bioremediation/Hazardous/Spill Cleanup—Absorbents with actives specifically chosen to attack a particular waste material could be engineered using the technology described herein. Exemplary waste materials include toxic waste, organic waste, hazardous waste, and non-toxic waste.

Pharma/Ag—Medications, skin patches, fertilizers, herbicides, insecticides, all typically use carriers blended with actives. Utilization of the technology described herein reduce the amount of active used (and the cost) while increasing efficacy.

Soaps, Detergents, and other Dry Products—Most dry household products could be engineered to be lighter, stronger, longer lasting, or cheaper using the technology as discussed above.

Mixtures of Different Particles—The composite particles can be dry mixed with other types of particles, including but not limited to other types of composite particles, extruded particles, particles formed by crushing a source material, etc. Mixing composite particles with other types of particles provides the benefits provided by the composite particles while allowing use of lower cost materials, such as crushed or extruded bentonite. Illustrative ratios of composite particles to other particles can be 75/25, 50/50, 25/75, or any other ratio desired. For example, in an animal litter created by mixing composite particles with extruded bentonite, a ratio of 50/50 will provide enhanced odor control, clumping and reduced sticking, while reducing the weight of the litter and lowering the overall cost of manufacturing the litter.

Mixtures of Composite Particles with Actives—The composite particles can be dry mixed with actives, including but not limited to particles of activated carbon.

It has been observed that one drawback to using the pan agglomeration processes of FIGS. 2 and 4 with clay feed materials is that they tend to be very dusty at the initial stages, which creates less than optimal operating conditions. This pre-wetting step is necessitated by limiting physical constraints. For example, the water uptake rate of the fine powder feed particle and growing agglomerate surfaces is generally insufficient without a pre-wetting step. The result is extreme dusting at the pan because the solid to available water ratios are exceeded in the uptake and growth zones in the pan. The materials have generally been pre-wetted to form a compact particle seed by adding enough moisture to the initial powder to roughly have 15-25% water with a target of 20% by weight in a pre-formed particle. The pre-wetting is usually accomplished by mixing in a compaction shear device, such as pin mixers or pug mills. The pre-wetted particle is fed into the pan where additional liquid is added to bring the final moisture up to the 30-40% wt range and the particles to the various sizes determined by pan residence time and final moisture. Final moisture values for clay particles tend to be between 30-35%, whereas final moisture values for agglomerated blends of clay and a light-weighting agent tend to be between 35-40%. Techniques for combining a pin-mixing step with a pan agglomeration process are described in US Patent Publication No. US2006/0243212 filed Apr. 29, 2005, published Nov. 2, 2006, which is hereby incorporated by reference in its entirety.

Pre-wetting has been found to increase the density of the thus-formed agglomerates making sufficient BDR hard to accomplish. However, it has been demonstrated that using these common feed systems without the pre-wetting step leads to a very dusty environment which results in decreased yield and inconsistent product from the pan.

The pan agglomeration designs of the present invention eliminate the need for a pre-wetting step, thus eliminating the need to use additional equipment such as a pin-mixer, which can result in huge cost-saving in the manufacturing process. Porosity and available surface area can be variables that are manipulated by the described process. Functional attributes such as density, permeability, binding strength and dissolution rate are then made controllably available for applications to consumer functional products, e.g. animal litter.

Single Step Pan Agglomeration

Figure 10:
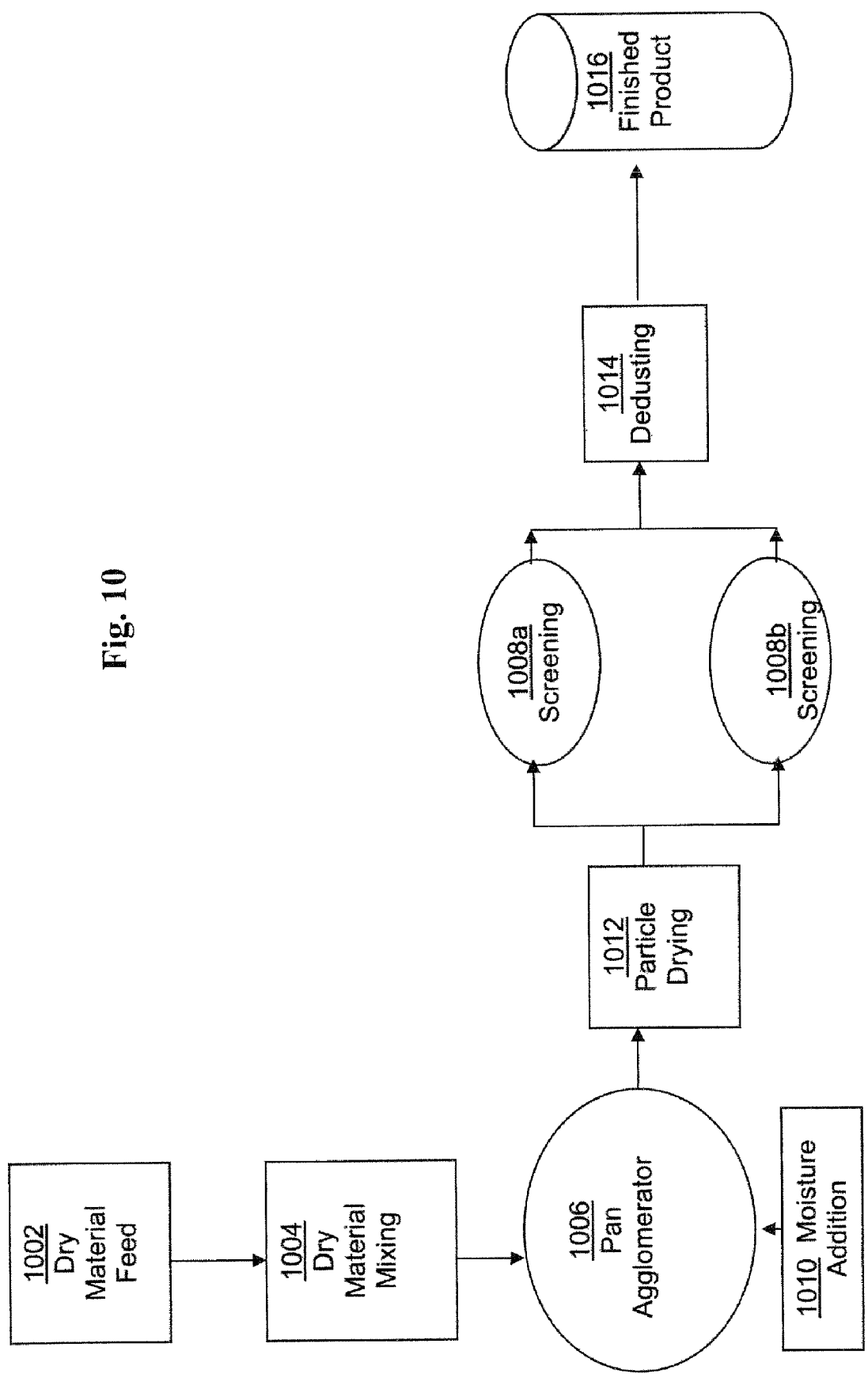
FIG. 10 is a process diagram illustrating an exemplary pan agglomeration process capable of rapid water uptake and evaporation.

FIG. 10 shows a pan agglomerator feed system that uses a single step pan, (i.e., the pan is all one depth and not tiered).

The pan is a 39 inch and has been run at pan angles from 50-60 degrees and pan speeds around 21-22 rpm. Aside from controlling the pan settings as detailed above, alterations and additions, as detailed below, to the pan configuration have resulted in improved results and have eliminated the need for a pre-wetting step.

Figure 11B:
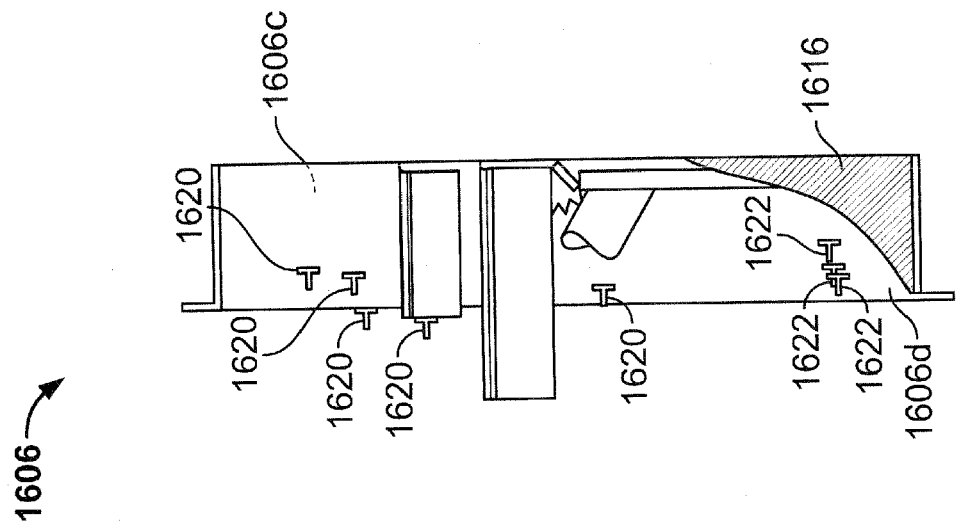
FIG. 11 is an illustration of an exemplary embodiment of a single step pan with an over/under feed.
Figure 11A:
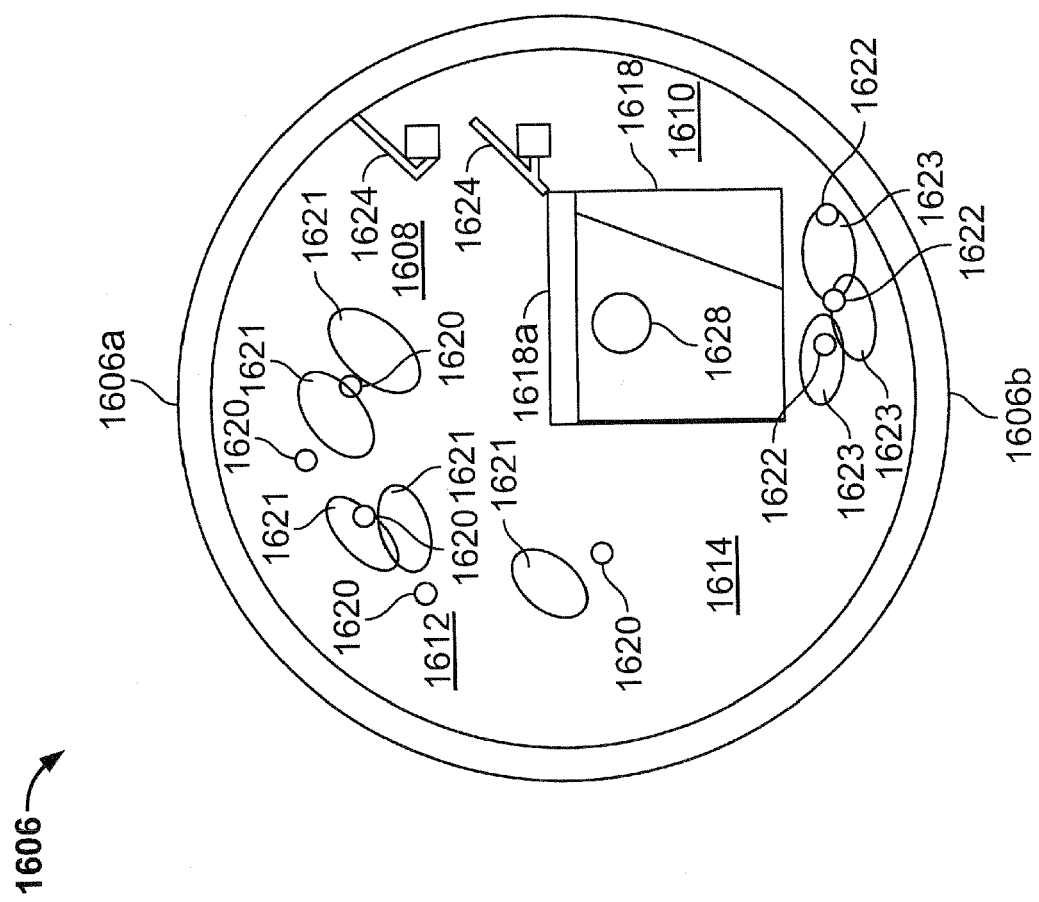

Pan agglomeration feed systems are dependent upon the material characteristics and the desired particle formed in the pan. When referring to the pan 1606, as shown in FIGS. 11*a* and 11*b*, the top of the pan 1606*a* refers to highest vertical position of the pan as the pan rotates; the bottom of the pan 1606*b* refers to the lowest vertical position of the pan as the pan rotates; the back of the pan 1606*c* refers to the depth location at the bed of the pan; the surface of the pan 1606*d* refers to depth location furthest away from the bed of the pan. Assuming the pan is rotating in a clockwise direction, typically a powder-sized (about 325 through 50 Tyler Series mesh) feed particle is fed in the 12 o'clock to 3 o'clock position 1608 of the pan. Feed particle size may be smaller for clay (e.g., between 200-325 mesh for sodium bentonite clay) and larger for light-weighting agents (e.g., between 10-200 mesh for expanded perlite). A liquid spray, typically water or a water solution that may contain other chemicals, is fed approximately in the 3 o'clock to 6 o'clock 610 or the 9 o'clock to 12 o'clock 612 quadrants of the pan for dust control and particle growth. The actual back of the pan is metal and is typically coated with a thin layer of material which will be referred to herein as the pan bed or bed of the pan. To avoid confusion the bulk of material circulating at any given time, which sits atop the pan bed will be referred to herein as the bed of material or material bed.

The agglomerate particles are formed by allowing the feed particles to enter the "growth zone" 1614 of the pan which is defined as the eye. The hoof of the pan contains the portion of material located in 1616. The eye of the pan is the dynamic embodiment of the mass in the hoof. The smaller particles start at the back of the eye bed and grow larger as they pick up the distributed water. As they grow larger, the interstitial space between the growing particles becomes greater thus the smaller particles fall back down into the lower part of the eye. This is commonly known in the art as sifting segregation.

In normal pan operations the small particles are fed on the surface 1606*d* of the material bed and some have to sift down to the back of the pan 1606*c* first in order to then be grown into agglomerates. This action densifies the particle. In addition, in normal operations, the bed depth contributes to the compaction and densification due to the downward force of gravity and the weight of material on the lower layer particles.

The present invention overcomes the problems of excessive dust formation and particle densification. The inventors have found that creating a curtain-like device 1618 that flows over the newly added dry feed substantially reduces dust formation and eliminates particle densification. Device 1618 is referred to as an "angel feed" and is more clearly illustrated in FIG. 12. A material curtain ("an over curtain") depicted by arrows 1730 and 1732 is formed which allows the dry powder 1731 to be contained just prior to addition into the rotating nucleated particles and thus reduces the free dust by 50-99% when measured by mass. Arrows 1730 represent material that falls from scraper 1618*a* and arrows 1732 represent material that falls from scrapers 1624 along the surface 1738 of the feeder. A diverter 1734 may be used to help control the direction of material flow. Feeder lip 1740 further assists with helping to control the direction of material flow. Feeder 1628 feeds feed particles under the material curtain through feed material exit 1736. Thus, the agglomeration process is no longer limited to the addition of relatively small amounts of powder to pre-wetted seed particles.

Additionally, a substantially unidirectional flow of material from the back of the pan upward to the surface is enabled, i.e., some of the small feed particles start at the back of the pan and grow into agglomerates as they rise to the surface, thereby eliminating the step of sifting segregation.

For animal litter applications the desired feed material is an absorbent clay, however, other compounds such as antimicrobial agents, odor absorbing compounds, light-weighting agents, fragrances, fixing agents, binding agents, litter filler materials, supplemental absorbent materials, supplemental deodorants, dust controlling agents, release agents, health indicating agents, and mixtures and combinations thereof can be added to the primary components of the litter material. These additional compounds can added at any time. For example, they may be added to the primary feed material or agglomerates thereof, further agglomerated with the initial agglomerates as a secondary coating, sprayed on during a spray-coating step, or dry blended with the agglomerated particles.

FIG. 10 illustrates an improved pan agglomeration process suitable for making animal litter. This process creates a 5-50% BDR compared to the raw material feed. The BDR can be significantly increased (to about 75%) with the addition of a light-weighting agent such as expanded perlite or cellulose fibers. The general steps for making pan agglomerated animal litter using the process 1500 of FIG. 10 are as follows (operating conditions and dimensions are those of a pilot plant 39 inch pan agglomerator). (1) Raw materials held in a feeder(s) 1502 (more than one feeder could be used, e.g., it may be desirable to meter-in activated carbon) are dry blended, (e.g., in a screw auger 1504) and fed into a rotating pan 1506 via an "Angel" or "Over/Under" feed (not shown). (2) Moisture 1510 is delivered to the pan through eight 4001 spray nozzles (not shown). As those skilled in the art can appreciate, sprayer size and number would increase as the process is scaled-up. The pan utilizes both gravitational and centripetal forces to slowly build particles using a rolling action. The particle size of the exiting granules is dependent on the orientation of the spray nozzles, the size of the water droplets, the rotational speed of the pan and the angle of the pan. The pan is a self-classifying system with particles exiting once they grow to a certain size. (3) Material exits pan 1506 and is conveyed to a dryer 1512. Both rotary and vibratory fluid bed (VFB) dryers have been used effectively by the inventors. Those skilled in the art will appreciate that other drying means could also be used. The material exits the dryer having a moisture level between 0-10%. (4) The dried agglomerate feed is then screened. For example, the material can be split and fed into 2 Sweco screeners 1508*a* and 1508*b* screening −6/+40 mesh, although more or less screeners with differing mesh sizes could also be used. (5) The agglomerated particles are then dedusted. For example, the particles can be conveyed through a dedusting device 1514 for air classification (i.e., dedusting) and collected in drums for testing in real time.

Particles have been formed using a bentonite clay, carbon and water formula matrix. Expanded perlite and Expanded Volcanic ash have also been introduced into various formulas. Cellulosic fibers could also be incorporated. Typical formulations are as shown in Table 4:

TABLE 4

| Component | Formula Range |
| --- | --- |
| Carbon | 0-1% |
| Expanded Volcanic Ash | 0-20% |
| Expanded Perlite | 0-20% |
| Clay | Balance |
| Recycle Stream | 0-20% |

Angel (Over/Under) Feed Agglomerator

The pan parameters of the system outlined above will affect the rate at which water is transferred from the sprayers to the clay particles, i.e., "water uptake rate". Such parameters include: Pan Angle (($\beta$), Pan Speed (n), Nozzle Placement, Water Droplet Size, Water Droplet Velocity, Raw Material Variability, Segregation/Insufficient Mixing of Inbound Dry Material, Feed System and Location, Scraper/Curtain Placement, Throughput, Dryer Inlet Chute, Bed Vibration, Supply (Heating) Zone Air, Center Weir, and Cooling Zone Air.

The desired solid PSD (particle size distribution) is dependent on the water uptake rate chosen. The water uptake rate is dictated by the distribution and flow characteristics of the liquid as well as the porosity and bulk density characteristics of the inbound material. The liquid droplet size of the binding water in conjunction with the liquid distribution over the solid feed creates clay to clay bonds having sufficient strength to withstand the high temperatures needed for incorporating a high evaporation rate into the process. Strong clay to clay particle bonds are formed which leads to an increase in overall particle strength of the agglomerated particles as a whole. Thus, the inventive process couples the rate at which water is incorporated into growing rotating particles in a tumbling agglomerator, e.g., a pan agglomerator, with the rate at which the water is driven off of the particles through evaporation to build substantial particle strength.

The pan angle, pan speed and pan dimensions (diameter and depth) are all interdependent parameters. The operating parameters and conditions detailed below are for a 39 inch diameter pilot plant scale pan agglomerator having a depth of 8 inches.

Pan Angle ($\beta$)

The pan or tilt angle is measured from the horizontal line at the base of the pan to the line created by the pan bed. Various tilt angles were tested. $\beta$ equal to about 55° was found to be appropriate. It was observed that a relatively high pan or tilt angle allows less material to fit inside the pan thereby decreasing the throughput capabilities of the pan. Relatively high tilt angles shorten the residence time of the material providing less time to grow agglomerates which either result in the formation of smaller particles or in the ejection of unagglomerated material from the pan prematurely. Furthermore, relatively high tilt angles affect material flow patterns tending to disrupt the shape of the falling curtain of material and causing the pan bed to be exposed. The pan bed refers to a relatively thin layer of material that covers the actual metal pan bed. An exposed pan bed could lead to water directly hitting it which creates clay buildup. As buildup occurs, chunks of material break off of the pan and fall into the growing agglomerates. The chunks continue to grow and compete with the agglomerates for water, hindering the water uptake rate of the agglomerates.

Pan Speed (n)

Pan speed is measured in rpm. Pan speed may be scaleable among pans of different diameters on an equal ft/min basis. According to literature, desired pan speed settings for ideal material flow distribution are ¾ of critical speed or nc where nc=42.3(sin($\beta$/D))0.5 and D=pan diameter in meters. According to the literature a calculation of 28 rpm would be appropriate, however, that speed was too fast for the pilot plant set up used. A pan speed of 21 rpm or 214 ft/min. was tested and found to be effective when used with a 39 inch pan and a tilt angle of 55°. A pan speed that is too high, compacts the agglomerates forming round, smooth surface, hard balls. Compaction aids in improving particle attrition, but it also increases the bulk density of the individual particles, thereby negatively affecting BDR (bulk density reduction). High pan speeds cause the material to be lifted and carried along the edge of the pan due to centripetal forces. Low pan speeds prevent the material from tumbling along the bed of the pan. This lack of rolling action prevents even water distribution among agglomerates and prevents the particle-to-particle interaction required to build strong, round agglomerates. Effects of both high and low pan speeds prevent the pan from having a falling curtain of material, causing the pan bed to be exposed, which for the reasons previously discussed, is undesirable.

Nozzle Placement

A uniform distribution of liquid droplets is key to particle growth. The distribution of liquid droplets is effected by nozzle placement. To cover an even amount of material, nozzles are placed in the direction of flow of material. FIG. 11 shows one configuration of nozzle placement and water flow distribution. In this embodiment, eight 4001 flat spray nozzles were used. Nozzles 1620 in the upper portion of the pan were used to grow agglomerates. Nozzles 1622 in the lower portion of the pan were used to control dust and send dryer material under the eye (which is located in quadrant 1614 and the lower portion of quadrant 1612) of the pan. The spray coverage of nozzles 1620 are shown as ovals 1621 and the spray coverage of nozzles 1622 are shown as ovals 1623. Shifting the growth nozzles towards the eye results in larger agglomerates, whereas shifting the nozzles away from the eye results in smaller agglomerates.

Nozzles that spray directly on any surface of the pan bed will contribute to buildup. Over spraying due to incorrect nozzle placement will also result in excessive build up on the pan bed and/or on the scraper(s) which results in scraper shavings or chunks. Aside from poor agglomerate formation, build up creates pressure on the scrapers and can strain the motor of the pan.

Water Droplet Size and Velocity

Droplet size is based on nozzle type, number of nozzles, moisture delivery, and pump pressure. Eight 4001 flat spray hydro nozzles from Spraying Systems Co. were tested. Less water is required to form agglomerates with small water droplets delivered from air-atomized nozzles. More water is required to form agglomerates from hydro nozzles. This is due to the nature of the water distribution. Smaller droplets create an even distribution of wetting. Larger droplets are unable to wet the bed of material as efficiently as smaller droplets when water delivery is held constant. Small droplets form small narrow bridges 1802 among the raw material particles 1804 during agglomerate growth as shown in FIG. 13*a*. Large droplets form large, wider bridges 1802 as shown in FIG. 13*b*. When the particles form water droplet bridges, the dry material begins to dissolve into the water, creating a bridge of material that remains in place once the water has evaporated. Stronger particle-to-particle bonds are formed from the larger bridge. This is due to the presence of more material between the particles. However, if the water droplets are too big, the water across the bridge will start to encompass the particles and hinder quenching, which will be discussed in more detail later.

The velocity of the water droplet leaving the nozzle head is dependant upon nozzle type, moisture delivery, and pump pressure. Water droplets with high velocities can cut through thin areas of the falling film of material and reach the bed of the pan where they can cause buildup, chunking, and imbalance to the water uptake rate.

Raw Material Variability

Inbound raw materials can have varying attributes. Moisture, density, and particle size variability are all aspects that can affect the finished product characteristics. For example, sodium bentonite clay varies in the moisture that it holds internally. Variation in moisture causes variations in the water uptake rate of the material, and the moisture addition must be changed in response to these variations. Significant variations in raw material density or particle size can affect both the attrition and final bulk density of the dried agglomerates.

It has been found that varied moistures of inbound raw materials can compact differently in the screw auger, resulting in an inconsistent delivery of raw materials to the pan. Additionally, the flow characteristics of the inbound material will likely be affected.

Segregation or Insufficient Mixing of Inbound Dry Material

Dry material, especially mixtures of dry materials with substantially different characteristics (e.g., bulk density, particle size distribution, moisture) can segregate in conveyance or have trouble mixing. Particle segregation or insufficient mixing delivers an inbound feed of constantly changing material to the pan. Certain materials uptake water faster than other materials causing constant change to the pan moisture addition (e.g., expanded perlite absorbs water differently than clay).

Over/Under (Angel) Feed System

Referring again to FIG. 11, the over/under feed system serves a dual purpose of center scraper 1618a as well as dry material feeder 1618. The dry material feeds in through a tube 1624 and then fans out into the angel feed device 1618. The material is delivered near the bottom right quadrant 1610 of the pan, right of the eye. Referring to FIG. 12, the over portion cascades down the face 1738 of the pan creating an over curtain over the "under" dry material.

The unders (i.e., material not agglomerated to a sufficient size to be ejected from the pan) are delivered directly onto the pan bed. As discussed, a dry layer of material (i.e., pan bed) is created on the direct surface of the pan, preventing wet material from sticking to the actual metal surface of the pan. The over curtain contains the under feed of dry material, preventing the feed from exiting the pan as dust. The over curtain also ensures that the dry particles will not exit the pan before they have a chance to turn into agglomerates, allowing for the PSD (particle size distribution) to stay within a tight range. The angel feed system improves the overall yield by reducing dust, buildup, and unders.

Scraper Placement

Scrapers scrape wet material off the pan bed and walls. The scrapers are placed slightly off the edge of the pan surfaces and cover the entire surface of the pan. Scraper placement directs material flow. Referring to FIG. 11, three scrapers 1618a and 1624 are positioned where they will redirect flow to the curtain. The scraper orientation can be used to direct the flow of material in the pan. In the case of the embodiment depicted in FIG. 11, scrapers 1624 direct the circulating material onto the angel feed system, creating the "over" curtain that prevents the dry inbound "under" material from exiting the pan. If the scrapers do not properly cover the entire surface of the pan, rings of buildup will form in the pan bed. As the material continues to build on the surface of the pan, the material closest to the pan begins to dry out. When the material dries out, it loses suction with the pan wall and falls off in chunks into the circulating bed of material. These chunks compete with the agglomerates for moisture, affecting the water uptake rate.

Throughput

Throughput is defined as the amount of material that enters the pan on a dry lb/hr basis. Low throughputs (i.e., about 0-500 lb/hr for the 39 inch pan) increase the residence time of material because less inbound material is present to push the agglomerates out. Increased residence time can lead to building large smooth agglomerates that are significantly compacted. However, low throughputs can attribute to a starved pan. High throughputs (i.e., about 1250-2000 lb/hr for the 39 inch pan) decrease the residence time of the agglomerates, sometimes pushing out the raw material before it is fully agglomerated. Additionally, high throughputs can attribute to a flooded pan. For example, an 800 lb/hr throughput has been tested and found to be effective for a 39 inch pan.

Back Axial Feed Tiered (Stepped) Pan Agglomerator

Figure 14:
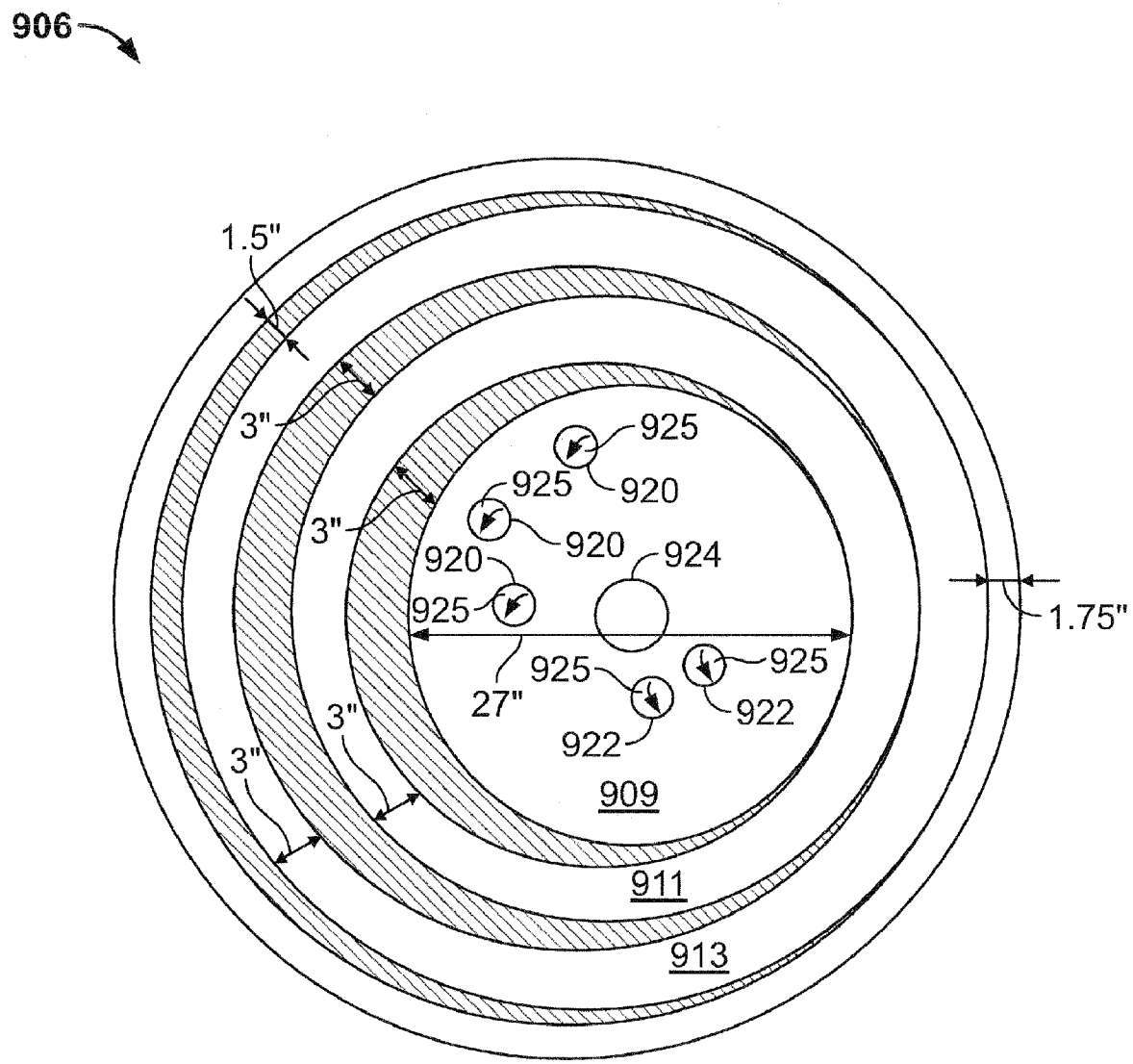
FIG. 14 is an illustration of an exemplary stepped pan.

Referring to FIG. 14, a stepped or tiered pan agglomerator is another embodiment of a pan agglomeration system that uses the rate at which water is incorporated into growing rotating particles through the use of a tumbling agglomeration method coupled with the rate at which the water is driven off of the particles through evaporation to build substantial particle strength.

In this embodiment, the bed depth is minimized by using a stepped pan 1906, and this in combination with the unique back axial feed 1924, insures that the particles grow from the upward direction and the compaction due to the downward sifting segregation as the small particles fall through the growth zone is removed. FIG. 14 shows a 39 inch 3 step pan. Step 1 1909 is 27 inches in diameter and about 3 inches deep. Step 2 1910 is about 3 inches wide and recessed an additional 3 inches in depth. Step 3 1911 is about 3 inches wide and recessed an additional 1½ inches. However, those skilled in the art will appreciate that the diameter, depth and number of steps could be varied and customized. Nozzles 1920 grow agglomerates, whereas nozzles 1922 wet the dry material and knock down dust. Arrows 1925 show the direction of spray from nozzles 1920 and 1922. Nozzles could be placed over either Step 2 or Step 3 if one or more coatings are desired.

In another embodiment a ramp as opposed to steps could also be used to vary the depth of the pan from the center outward.

Agglomerated particles can be formed on the back fed axial step pan agglomerator using a bentonite clay, carbon and water formula matrix. Expanded perlite and Expanded volcanic ash can also been introduced into various formulas. Typical formulations are as shown in Table 5:

TABLE 5

| Component | Formula Range |
| --- | --- |
| Carbon | 0-1% |
| Expanded Volcanic Ash | 0-20% |
| Expanded Perlite | 0-20% |
| Clay | Balance |
| Recycle Stream | 0-20% |

The general steps for making pan agglomerated cat litter are similar to those outlined above. The raw materials are dry blended in a screw auger and fed into the rotating pan. Referring to FIG. 14, in this embodiment, the feed particles enter through a back axial feed 1924 in the center of the pan 1906 under the curtain of rotating particles formed in the eye of the pan, i.e., the growth zone. Moisture is delivered to the pan through eight 4001 spray nozzles 1920 and 1922. The pan utilizes both gravitational and centripetal forces to slowly build particles using a rolling action. The steps (or tiers) in the pan allow the continued growth of the particle without having to subject the particle to the full depth of the growth zone (the pan eye). This prevents the weight of the larger particles from compacting and densifying the smaller particles. The back axial feed allows the feed particles which are generally a fine powder to flow along the surface of the pan thereby taking advantage of the full length of the shortened growth zone depth.

The particle size of the exiting granules is dependent on the orientation of the spray nozzles, the size of the water droplets, the rotational speed of the pan and the angle of the pan. Like the single step pan, the back axial feed pan is a self-classifying (or self-sieving) system with particles exiting once they grow to a certain size. Material exits the pan as discussed with reference to the single step pan agglomerator and is conveyed to a dryer.

Both a vibratory fluid bed (VFB) and a rotary driers have been used. VFB driers tend to result in less dense and less polished (less rounded) finished particles, whereas rotary driers tend to result in more dense and more polished finished particles. Less dense and more rounded particles are desired.

Typically, agglomerated clay-based particles are brought back down to a moisture level between 5-15% because it was thought that overdrying would lead to an increase in attrition (the tendency of particles to fall apart). Typical drying temperatures used are in the 525° F. range. The inventors have surprisingly found that by rapidly drying the agglomerated particles at elevated temperatures as opposed to using routine parameters, improved particle strength is achieved (e.g., bringing moisture levels down to about 0-2% actually resulted in hard particles with improved attrition). Rapid drying has been accomplished by feeding agglomerates into temperatures around 650-700° F. to achieve 0-2% moisture levels. However, the long term attrition and low moisture of these particles increase in humid environments.

To avoid rehydration of the particles, drying conditions that allow rapid drying of the particle bridges as shown in 1804 as opposed to the entire particles 1802 themselves may be necessary. The bridges would form into hard bonds, while the particles themselves would retain about 6-10% moisture. Rapid drying of the particle bridges can be accomplished by feeding agglomerates into temperatures around 1100° F. with short residence times to achieve 6-10% particle moisture levels. Because moisture is bound within the particle, the moisture would tend to expand outward from the center of the particle towards the particle surface during the rapid drying process which would keep the particle surfaces relatively cool and avoid overdrying.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method for forming porous agglomerated particles comprising:
   (a) providing feed particles less than 5000 microns without pre-wetting the feed particles;
   (b) feeding said feed particles into a pan agglomerator such that the feed particles enter substantially at the back of the pan to significantly reduce dust formation;
   (c) forming a falling curtain comprising growing agglomerate particles, wherein the growing agglomerate particles fall over the entering feed particles;
   (d) providing a uniform distribution of uniformly-sized liquid droplets onto the curtain of feed particles and growing agglomerate particles;
   (e) rotating and tilting the pan such that the liquid droplets are not applied directly to the bed of the pan; and
   (f) forming porous agglomerated particles that have a moisture content between 0-75 percent.

2. A method for forming porous agglomerated absorbent particles suitable for use as an animal litter comprising:
   (a) providing feed particles less than 5000 microns without pre-wetting the feed particles;
   (b) feeding said feed particles into a pan agglomerator such that the feed particles enter substantially at the back of the pan to significantly reduce dust formation, wherein said feed particles comprise an absorbent material suitable for use as an animal litter;
   (c) forming a falling curtain comprising growing agglomerate particles, wherein the growing agglomerate particles fall over the entering feed particles;
   (d) providing a uniform distribution of uniformly-sized liquid droplets onto the curtain of feed particles and growing agglomerate particles;
   (e) rotating and tilting the pan such that the liquid droplets are not applied directly to the bed of the pan; and
   (f) forming porous agglomerated absorbent particles suitable for use as an animal litter that have a moisture content between 0-75 percent.

3. The method of claim 2 further comprising:
   (g) drying said porous agglomerated absorbent particles having a moisture content between 0-75% to produce dried porous agglomerated absorbent particles having a moisture content between 0-15%.

4. The method of claim 3, wherein said drying is accomplished by rapid heating.

5. The method of claim 1, wherein some of the feed particles grow into agglomerated particles as they move unidirectionaly from the back of the pan to the surface of the pan.

6. The method of claim 1, wherein the back of the pan has a greater depth than the surface of the pan.

7. The method of claim 6, wherein the pan is tiered, ramped or a combination thereof.

8. The method of claim 6, wherein the feed particles enter the back of the pan through the axis of the pan.

9. A plurality of porous agglomerated particles produced by the method recited in claim 1.

10. A plurality of porous agglomerated absorbent particles produced by the method recited in claim 2.

11. The porous agglomerated particles of claim 10, wherein the feed particles comprise an absorbent clay.

12. The porous agglomerated particles of claim 8, wherein the feed particles comprise an absorbent clay and at least one performance-enhancing active.

13. The porous agglomerated particles of claim 8, wherein the feed particles comprise a bentonite clay and activated carbon.

14. The porous agglomerated particle of claim 8 having a bulk density reduction of at least 5%.

15. The porous agglomerated particle of claim 8 having a bulk density reduction between 5-75%.

* * * * *